(12) United States Patent
Miyazaki et al.

(10) Patent No.: US 9,880,383 B2
(45) Date of Patent: Jan. 30, 2018

(54) DISPLAY DEVICE

(71) Applicant: OLYMPUS CORPORATION, Hachioji-shi, Tokyo (JP)

(72) Inventors: Kanto Miyazaki, Tokyo (JP); Satoshi Watanabe, Tokyo (JP); Koji Matsumoto, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/463,410

(22) Filed: Mar. 20, 2017

(65) Prior Publication Data

US 2017/0192230 A1 Jul. 6, 2017

Related U.S. Application Data

(63) Continuation of application No. PCT/JP2014/005063, filed on Oct. 3, 2014.

(51) Int. Cl.
*G02B 27/01* (2006.01)
*G02B 27/00* (2006.01)
*G02B 17/00* (2006.01)
*G03B 21/28* (2006.01)

(52) U.S. Cl.
CPC ....... *G02B 27/0081* (2013.01); *G02B 17/006* (2013.01); *G02B 27/01* (2013.01); *G02B 27/0172* (2013.01); *G03B 21/28* (2013.01)

(58) Field of Classification Search
CPC .. G02B 27/0081; G02B 27/022; G02B 27/09; G02B 27/01; G02B 27/0172; G02B 27/18; G02B 13/16; G02B 17/006
USPC .................. 359/630, 633, 636, 637; 385/901
See application file for complete search history.

(56) References Cited

U.S. PATENT DOCUMENTS

| 8,098,439 B2* | 1/2012 | Amitai ............ G02B 13/22 345/7 |
| 2008/0198471 A1 | 8/2008 | Amitai |
| 2009/0190222 A1 | 7/2009 | Simmonds et al. |
| 2014/0192418 A1 | 7/2014 | Suzuki |
| 2015/0177516 A1* | 6/2015 | Blonde ............. G02B 27/017 359/316 |

(Continued)

FOREIGN PATENT DOCUMENTS

| JP | 2013061480 A | 4/2013 |
| WO | 2005124428 A1 | 12/2005 |

(Continued)

OTHER PUBLICATIONS

International Search Report (ISR) and Written Opinion dated Apr. 7, 2015 issued in International Application No. PCT/JP2014/005063.

*Primary Examiner* — William C Dowling
(74) *Attorney, Agent, or Firm* — Holtz Holtz & Volek PC

(57) ABSTRACT

Provided is a display device that can be readily reduced in size and thickness, and is capable of reducing luminance unevenness within an image. The display device includes: a projection optical system that projects image light at infinity; and a first propagation optical system, a second propagation optical system, and a third propagation optical system, which sequentially enlarge, in one direction, the image light projected from the projection optical system, in which the image light output from the third propagation optical system allows an image to be observed.

6 Claims, 20 Drawing Sheets

(56) References Cited

U.S. PATENT DOCUMENTS

| | | | |
|---|---|---|---|
| 2015/0277125 A1* | 10/2015 | Hirano | G02B 6/0088 359/633 |
| 2016/0154243 A1* | 6/2016 | Aiki | G02B 17/00 359/633 |

FOREIGN PATENT DOCUMENTS

| | | |
|---|---|---|
| WO | 2007029032 A1 | 3/2007 |
| WO | 2011024291 A1 | 3/2011 |

* cited by examiner

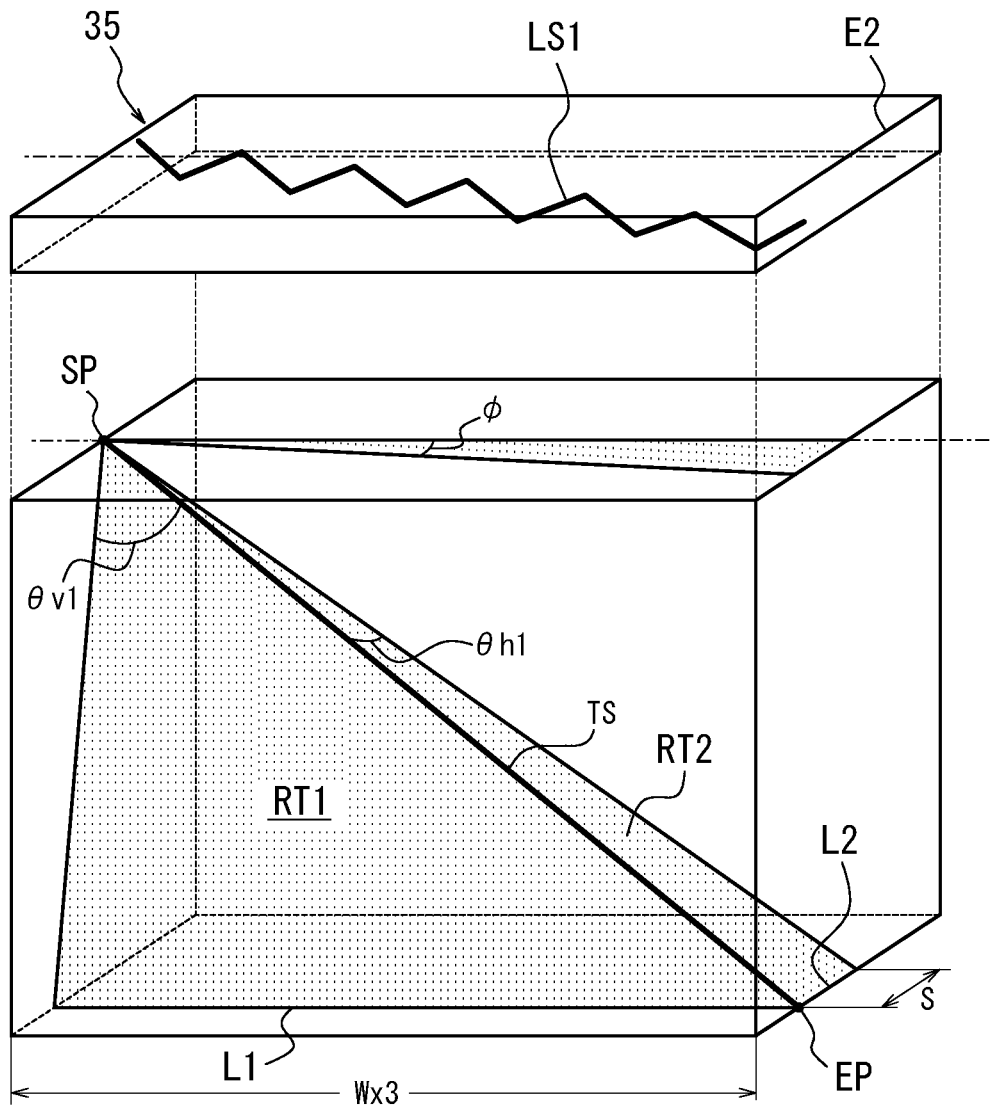
FIG. 12
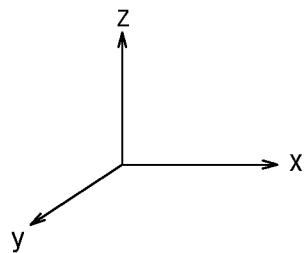

DISPLAY DEVICE

CROSS-REFERENCE TO RELATED APPLICATION

The present application is a Continuing Application based on International Application PCT/JP2014/005063 filed on Oct. 3, 2014, the entire disclosure of this earlier application being incorporated herein by reference.

TECHNICAL FIELD

This disclosure relates to a display device which enlarges an exit pupil to project an image.

BACKGROUND

A device hitherto proposed as an example of such display device includes, for example, two optical elements each enlarging the exit pupil of a projection optical system in an arbitrary one direction as being disposed orthogonal to each other, so as to two-dimensionally enlarge the exit pupil (see, for example, JP2013061480A; hereinafter, Patent Literature (PTL) 1).

CITATION LIST

Patent Literature

PTL 1: JP2013061480A

SUMMARY

The disclosed display device includes:

a projection optical system which projects image light at infinity; and a first propagation optical system, a second propagation optical system, and a third propagation optical system, which sequentially enlarge, in one direction, the image light projected from the projection optical system, in which the image light emitted from the third propagation optical system allows an image to be observed.

The first propagation optical system, the second propagation optical system, and the third propagation optical system may each include:

a light guide part which guides the image light incident thereon, by repeatedly reflecting the image light between two opposing faces thereof; and an output deflection part which sequentially emits part of the image light guided through within the light guide part, from one face of the two faces to enlarge the image light, and at least the second propagation optical system may have a light flux expanding direction intersecting with light flux expanding directions of the first propagation optical system and the third propagation optical system.

The output deflection part of at least one of the first propagation optical system, the second propagation optical system, and the third propagation optical system may have a plurality of beam splitting films arranged along the propagation direction of the image light in the light guide part as tilted between the two faces of the light guide part, and may emit the image light partially reflected by the beam splitting films, from the one face.

The output deflection part of at least one of the first propagation optical system, the second propagation optical system, and the third propagation optical system may include a beam splitting film and a prism array which are disposed on the other face of the two faces of the light guide part, so as to transmit, through the beam splitting film and the light guide part, the image light having transmitted through the beam splitting film and reflected by the prism array, and emits the image light from the other face.

The output deflection part of at least one of the first propagation optical system, the second propagation optical system, and the third propagation optical system may include a beam splitting film and a grating which are disposed on the other face side of the two faces of the light guide part, so as to transmit, through the beam splitting film and the light guide part, the image light having transmitted through the beam splitting film and diffracted by the grating, and emit the image light from the other face.

The projection optical system may be disposed as extending substantially parallel to an emitting face of the image light in the third propagation optical system.

BRIEF DESCRIPTION OF THE DRAWINGS

In the accompanying drawings:

FIG. 12 is an explanatory view of a light flux propagated in the x-direction within the second light guide part;

DETAILED DESCRIPTION

Hereinafter, Embodiments of the disclosed device are described with reference to the drawings.

Embodiment 1

Figure 1A:
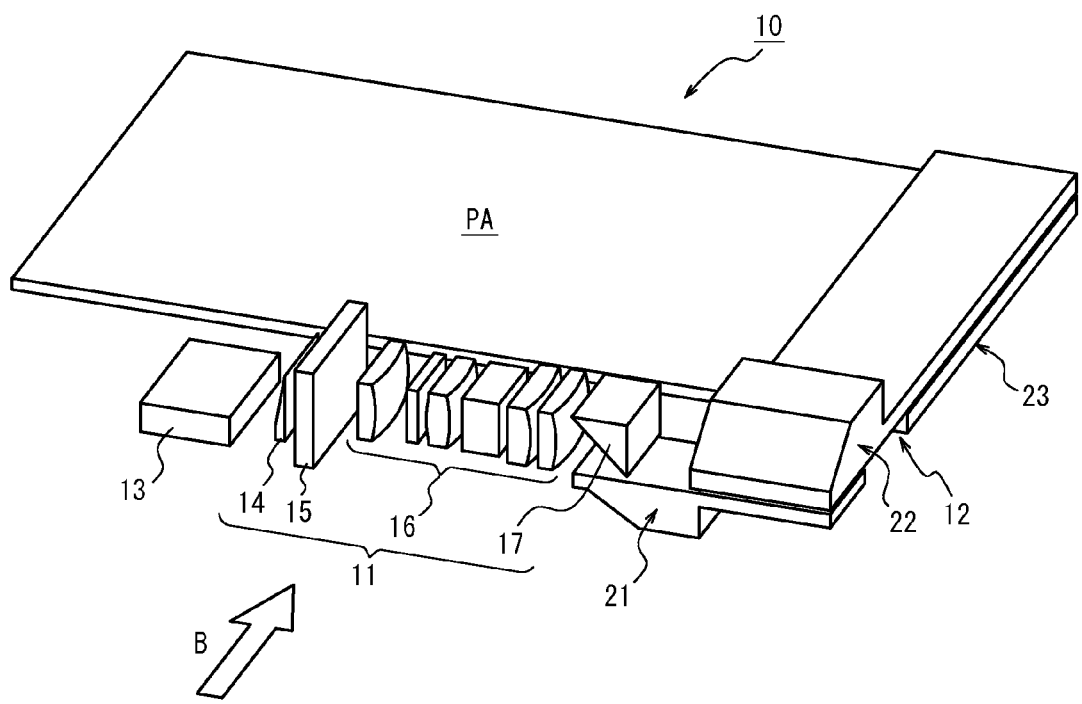
FIG. 1A is a perspective view illustrating a schematic configuration of the disclosed display device of Embodiment 1.
Figure 1B:
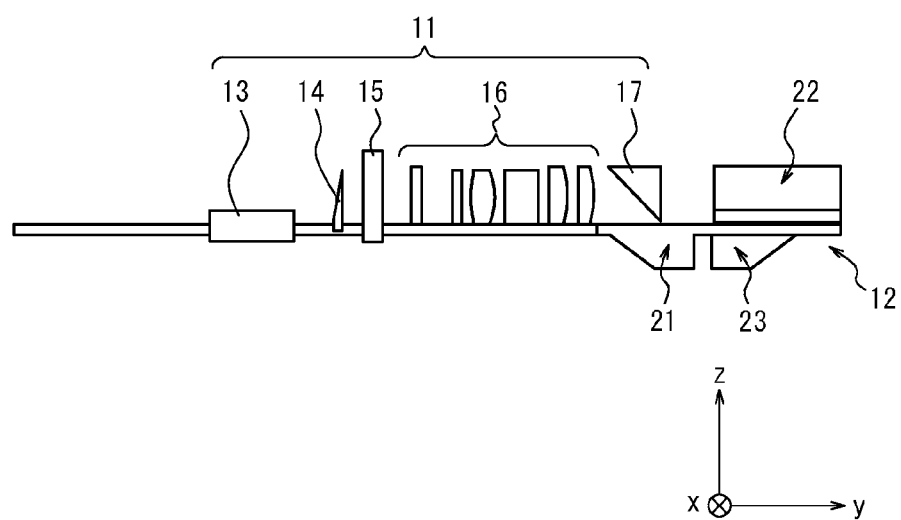
FIG. 1B shows the B arrow view of FIG. 1A.

FIG. 1A is a perspective view illustrating a schematic configuration of the disclosed display device of Embodiment 1. FIG. 1B shows the B arrow view of FIG. 1A. The display device 10 of Embodiment 1 is configured by including a projection optical system 11 and a pupil enlarging optical system 12. In the following, as illustrated in FIG. 1, the y-direction refers to the in-plane lateral direction in the vicinity of the pupil enlarging optical system 12, the z-direction refers to the in-plane longitudinal direction, and the x-direction refers to the in-plane vertical direction, for the sake of convenience. The y-direction, the z-direction, and the x-direction are orthogonal to one another.

The projection optical system 11 projects at infinity image light corresponding to an arbitrary image. The pupil enlarging optical system 12 enlarges the exit pupil of the projection optical system 11 to emit image light to be projected. This way allows an observer to observe the image by focusing the eye to an arbitrary position within a projection region PA serving as an emitting plane of image light of the pupil enlarging optical system 12.

The projection optical system 11 is configured by including: a light source 13; a light flux expanding/diffusing element 14; a transmissive color liquid crystal display device 15 (hereinafter, simply referred to as LCD panel 15); a projection part 16; and a folding mirror 17.

The light source 13 has three laser light sources emitting laser lights in three colors of, for example, red (R), green (G), and blue (B), and emits those laser lights from the laser light sources, along the same optical axis. The R light, the G light, and the B light each have a wavelength of, for example, R: 640 nm, B: 520 nm, B: 450 nm, respectively.

The light flux expanding/diffusing element 14 enlarges/diffuses incident laser light and emits the resulting light.

The LCD panel 15 is, for example, rectangular in shape elongated by 5.6 mm in the x-direction and by 4.5 mm in the y-direction. The LCD panel 15 forms an arbitrary image to be displayed on the display device 10, and transmits, according to the image, the laser light from the light source 13 uniformly illuminated by the light flux expanding/diffusing element 14, to thereby spatially modulate the laser light to generate image light.

The projection part 16 has an exit pupil of, for example, 5 mm to 10 mm in diameter, and projects at infinity the image light spatially-modulated by the LCD panel 15. As an example, the projection part 16 is configured to have a focal length of 28.8 mm, F-number of 4, and an exit pupil diameter of 7 mm. Here, the image light to be emitted by the projection part 16 refers to a group of parallel light fluxes having the x-direction and y-direction positions of each pixel of the LCD panel 15, that is, angular components in the x-direction and y-direction according to the object height from the optical axis. For example, the projection part 16 emits image light in an angular range of ±4.6° in the x-direction and ±5.7° in the y-direction. The image light projected by the projection part 16 is reflected by the folding mirror 17 to be incident on the pupil enlarging optical system 12.

Figure 2:
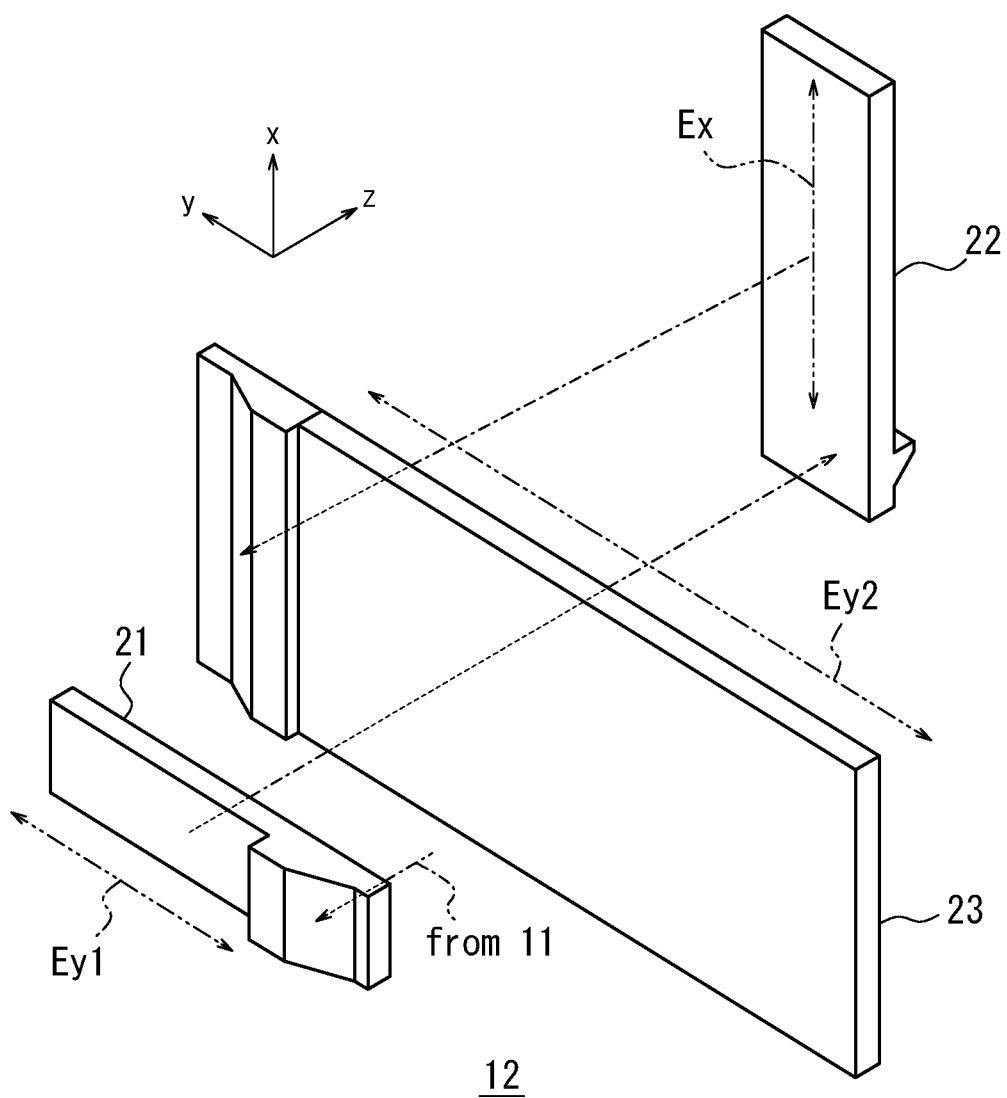
FIG. 2 is an exploded perspective view of the pupil enlarging optical system of FIG. 1.

Next, a configuration of the pupil enlarging optical system 12 is described with reference to the exploded perspective view of FIG. 2. The pupil enlarging optical system 12 is configured by including: a first propagation optical system 21; a second propagation optical system 22; and a third propagation optical system 23.

The first propagation optical system 21 is disposed such that the incident region of a light guide part to be described later and the exit pupil of the projection part 16 coincide with each other, and enlarges the projected exit pupil in the y-direction across the region of Ey1. The exit pupil enlarged in the y-direction by the first propagation optical system 21 is then enlarged in the x-direction across the region of Ex and emitted by the second propagation optical system 22. The exit pupil enlarged in the x-direction by the second propagation optical system 22 is further enlarged in the y-direction across the region of Ey2 and emitted from the projection region PA serving as the image light emitting plane, by the third propagation optical system 23. This way allows an observer to observe the image by focusing the eye to an arbitrary position within the projection region PA.

As illustrated in FIGS. 1A and 1B, in Embodiment 1, the projection optical system 11 is disposed extending substantially parallel to the image light emitting plane of the third propagation optical system 23 forming the projection region PA of the pupil enlarging optical system 12. Accordingly, the display device 10 can readily be reduced in size and thickness.

Figure 3:
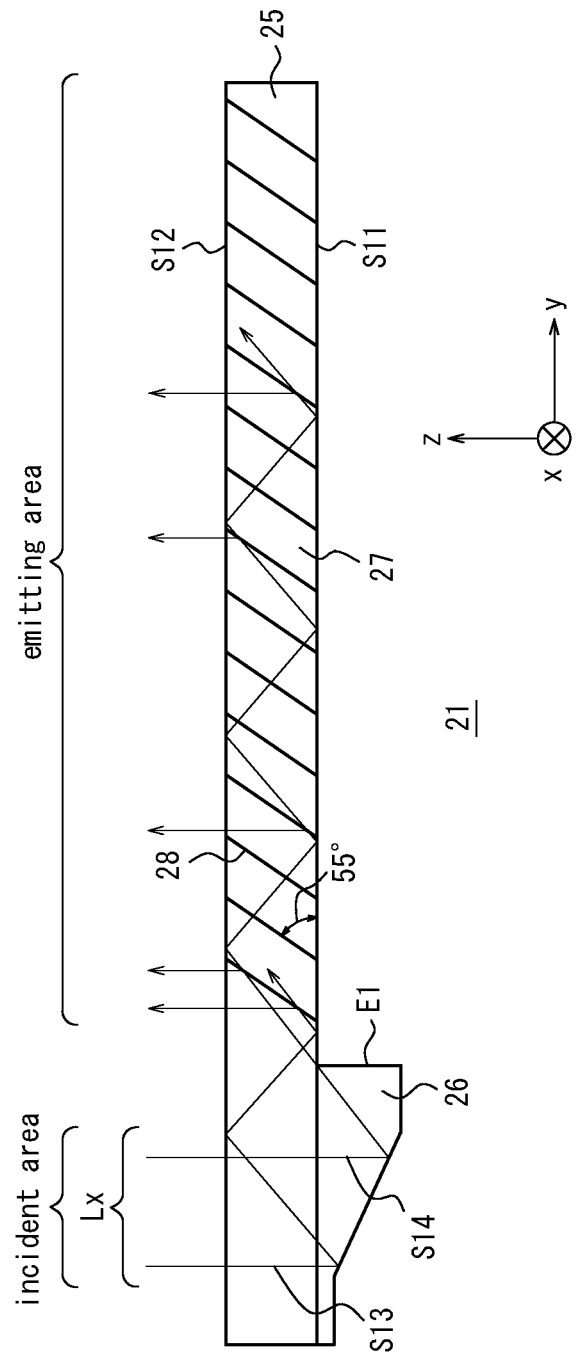
FIG. 3 is an explanatory view of the first propagation optical system.

Next, with reference to FIG. 3, the first propagation optical system 21 is explained in its configuration and its function of enlarging the exit pupil. The first propagation optical system 21 is configured by including: a first light guide part 25; a first input deflection part 26; and a first output deflection part 27. The first light guide part 25 is formed like a generally-transmissive parallel plate, which has a first plane S11 and a second plane S12 which are parallel and opposing to each other.

The first input deflection part 26 is, for example, a prism made of quartz, and has an input-side bonding plane S13 planar in shape and a slope S14 sloping relative to the input-side bonding plane S13. The slope S14 is evaporated with aluminum, which serves as a reflective film. In the first input deflection part 26, the input-side bonding plane S13 is bonded via a transparent adhesive to the first plane S11 at one end of the first light guide part 25. The first input deflection part 26 is colored black across an end face E1 on the other end side of the first light guide part 25, so as to absorb light fluxes incident on the end face E1 without reflection.

The first output deflection part 27 includes a plurality of beam splitting films 28 arranged along the light-guiding direction of image light between the first plane S11 and the second plane S12, at a predetermined angle (550 in Embodiment 1) relative to the first plane S11 and the second plane S12. In practice, the first light guide part 25 and the first output deflection part 27 are formed of transparent members made of, for example, quartz each having a slope, which are sequentially laminated via the beam splitting films 28, so as to be formed like a parallel plate having the first plane S1 and the second plane S12. As necessary, the second plane S12 of the first light guide part 25 has an antireflection film formed thereon for suppressing reflection of image light incident from the vertical direction. In the longitudinal direction (the y-direction of FIG. 3) of the first propagation optical system 21, a region to dispose the first input deflection part 26 and a region to dispose the first output deflection part 27 are each hereinafter referred to as incident region and emitting region, respectively.

Here, the first input deflection part 26 may be formed of the same material as the first light guide part 25, to thereby ideally suppress reflection at the interface between the input-side bonding plane S13 and the first plane S11.

The first propagation optical system 21 is disposed so as to allow a light flux Lx parallel to the optical axis of the projection optical system 11 to be externally incident vertically on the incident region of the second plane S12. The light flux Lx that has been vertically incident on the incident region is then incident on the first input deflection part 26 from the first light guide part 25, and reflected obliquely by the slope S14. The obliquely-reflected light flux Lx passes through the first plane S11 of the first light guide part 25 to be incident on the second plane S12. The vertical angle formed by the slope S14 with respect to the input-side bonding plane S13 of the first input deflection part 26 is defined so as to cause total reflection of the light flux Lx that has been reflected by the slope S14 and incident on the second plane S12.

Accordingly, the incident angle θ relative to the second plane S12 within the first light guide part 25 needs to exceed a critical angle, that is, to satisfy $\theta > \sin^{-1}(1/n)$ (n is a refractive index of the light guide part 25). The critical angle is 43.6°, with the first light guide part 25 made of quartz for example.

A light flux of object height that is vertically incident from the projection optical system 11 is incident on the second plane S12 within the first light guide part 25 at an incident angle θ. The incident angle θ is double of the inclination angle of the slope S14 relative to the input-side bonding plane S13 of the first input deflection part 26, and thus, the inclination angle needs to be at least 21.8°. In Embodiment 1, the inclination angle is, for example, 25.8°.

Here, the angle of a light beam incident on the incident region of the second plane S12 is controllable based on the size of the LCD panel 15 and the focal length of the projection part 16. For example, the angle of an incident light beam may be controlled to fall within a range of ±4.6° in the x-direction and ±5.7° in the y-direction on the air side, and within a range of +3.1° in the x-direction and ±3.9° in the y-direction in a medium of the first light guide part 25 made of quartz. With the incident angle being thus controlled to fall within the aforementioned ranges, light fluxes of image light according to all the object heights can be subjected to total reflection on the second plane S12 within the light guide part 25.

The light flux (image light) Lx reflected by the slope S14 of the first input deflection part 26 is obliquely incident on the emitting region of the second plane S12 within the first light guide part 25. The obliquely-incident light flux Lx is incident on the second plane S12 at an angle larger than a critical angle and totally reflected. The totally-reflected light flux Lx is obliquely incident on the beam splitting film 28, so as to be reflected in an amount according to the incident angle while the remainder passing therethrough. The light flux Lx having passed through the beam splitting film 28 is incident on the first plane S11 at an angle larger than a critical angle and totally reflected. Thereafter, the light flux Lx is repeatedly subjected to the partial transmission through the beam splitting film 28 and to the total reflection on the second plane S12 and the first plane S11, so as to be propagated in the x-direction of the light guide part 25. Then, some of the light fluxes having been reflected by the beam splitting film 28, which are incident on the second plane S12 at an angle smaller than the critical angle, pass through the second plane S12 to be emitted therefrom.

Figure 4:
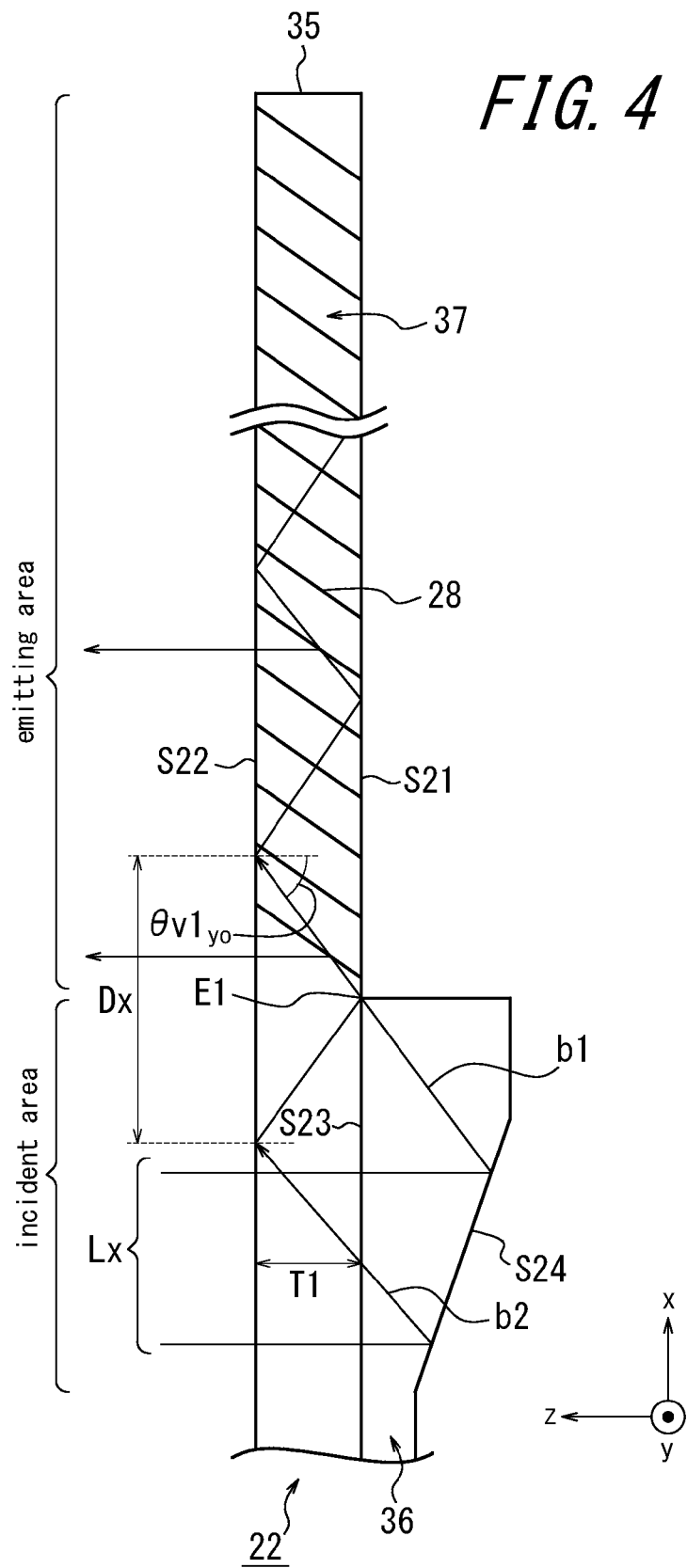
FIG. 4 is an explanatory view of the second propagation optical system.

The second propagation optical system 22 is configured by including, as illustrated in the partial detail view of FIG. 4: the second light guide part 35; the second input deflection part 36; and the second output deflection part 37, similarly to the first propagation optical system 21. The third propagation optical system 23 is configured by including, as illustrated in the partial detail view of FIG. 5: the third light guide part 45; the third input deflection part 46; and the third output deflection part 47, similarly to the first propagation optical system 21. Here, a half-wave plate for adjusting polarization of image light incident on the propagation optical system in the subsequent stage may be disposed between the first propagation optical system 21 and the second propagation optical system 22 or between the second propagation optical system 22 and the third propagation optical system 23.

The second propagation optical system 22 is disposed so as to receive incident image light emitted from the first propagation optical system 21 and to emit the light by guiding the light in the x-direction. The third propagation optical system 23 is disposed so as to receive incident image light emitted from the second propagation optical system 22 and to emit the light by guiding the light in the y-direction. With this configuration, the exit pupil of the projection part 16 is enlarged in the y-direction by the first propagation optical system 21 and then enlarged in the x-direction by the second propagation optical system 22, before being further enlarged in the y-direction by the third propagation optical system 23. Thereafter, image light is emitted from the projection region PA.

Figure 6:
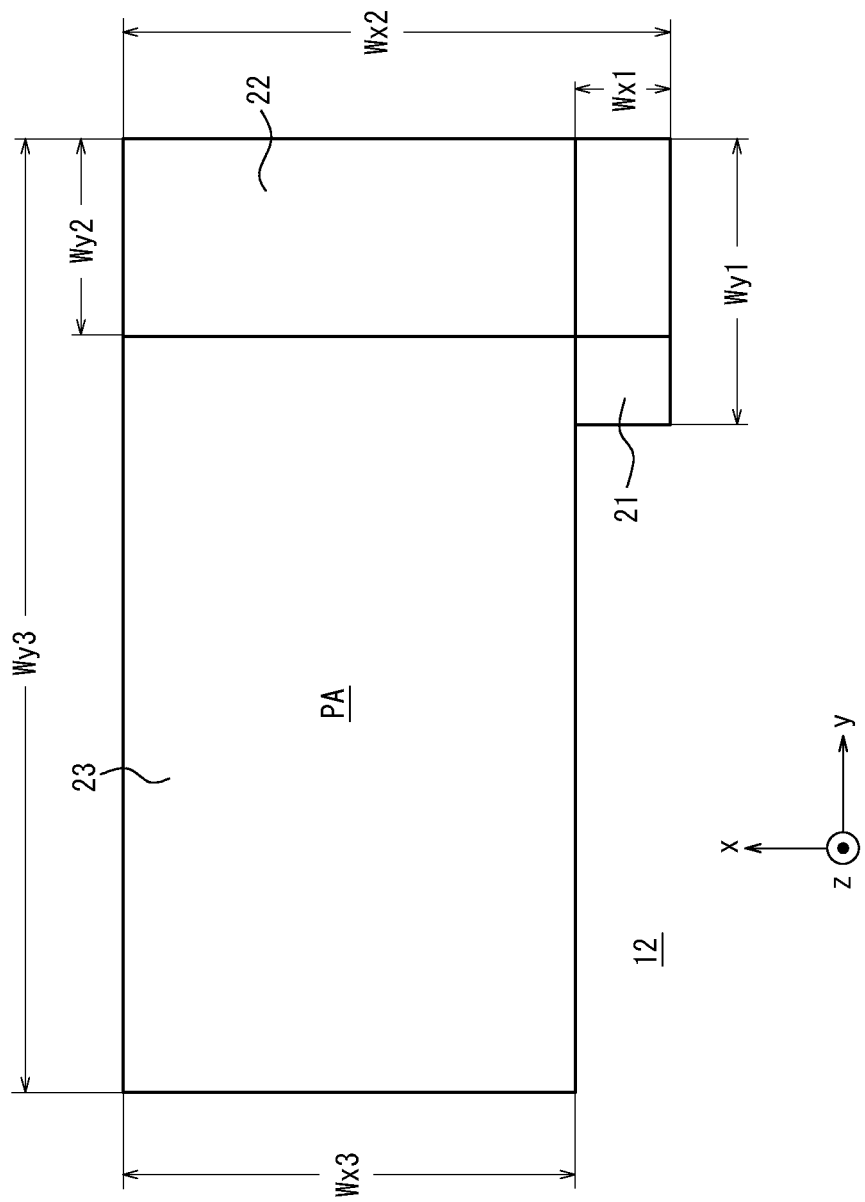
FIG. 6 is an explanatory view of exemplary dimensions of the pupil enlarging optical system.

FIG. 6 is an explanatory view of exemplary dimensions of the pupil enlarging optical system 12. The first propagation optical system 21 has a y-direction dimension Wy1 of, for example, 27 mm and an x-direction dimension Wx1 of, for example, 10 mm. The second propagation optical system 22 has a y-direction dimension Wy2 of, for example, 20 mm and an x-direction dimension Wx2 of, for example, 60 mm. The third propagation optical system 23 has a y-direction dimension Wy3 of, for example, 120 mm and an x-direction dimension Wx3 of, for example, 50 mm. The emitting region of the first propagation optical system 21 has a length in the y-direction that is substantially equal to the y-direction dimension Wy2 of the second propagation optical system 22. The emitting region of the second propagation optical system 22 has a length in the x-direction that is substantially equal to the x-direction dimension Wx3 of the third propagation optical system 23.

Further, in the first propagation optical system 21, the second propagation optical system 22, and the third propagation optical system 23, the light guide parts each have a thickness, i.e., the distance between the first plane and the second plane, of 2 mm, for example. In each of the first propagation optical system 21, the second propagation optical system 22, and the third propagation optical system 23, the beam splitting films 28 are disposed at intervals of, for example, 1.4 mm. Therefore, the first propagation optical system 21 includes, for example, 15 layers of the beam splitting films 28 in the y-direction, the second propagation optical system 22 includes, for example, 39 layers of the beam splitting films 28 in the x-direction, and the third propagation optical system 23 includes, for example, 72 layers of the beam splitting films 28 in the y-direction.

Here, the beam splitting films 28 may preferably be configured to have a larger reflectance as the distance from the incident region toward the light guiding direction. In Embodiment 1, the beam splitting films 28 are categorized into BS film types of A to H depending on the reflectance, as shown in Table 1. Then, as shown in Table 2, the first propagation optical system 21 is configured by including two types of the beam splitting films 28 of BS film types C and D. As shown in Table 3, the second propagation optical system 22 is configured by including four types of the beam splitting films 28 of BS film types of A, B, C, and D. As shown in Table 4, the third propagation optical system 23 is configured by including four types of the beam splitting films 28 of BS film types of E, F, G, and H. Here, Table 1 shows the reflectance obtained for the incident angles of 55° and 15° of light with a wavelength of 520 nm. Further, in Tables 2, 3, and 4, the BS film number indicates the order of image light from the incident side.

TABLE 1

| BS film type | reflectance (%) | |
| --- | --- | --- |
| | incident angle 55° | incident angle 15° |
| A | 8 | 0.5 |
| B | 10 | 0.6 |
| C | 15 | 0.9 |
| D | 25 | 1.6 |
| E | 5 | 0.3 |
| F | 6 | 0.4 |
| G | 11 | 0.7 |
| H | 22 | 1.4 |

TABLE 2

First Propagation Optical System

| BS film number | BS film type |
| --- | --- |
| 1 to 7 | C |
| 8 to 15 | D |

TABLE 3

Second Propagation Optical System

| BS film number | BS film type |
| --- | --- |
| 1 to 13 | A |
| 14 to 23 | B |
| 24 to 31 | C |
| 32 to 39 | D |

TABLE 4

Third Propagation Optical System

| BS film number | BS film type |
| --- | --- |
| 1 to 24 | E |
| 25 to 46 | F |
| 47 to 60 | G |
| 61 to 72 | H |

Figure 7:
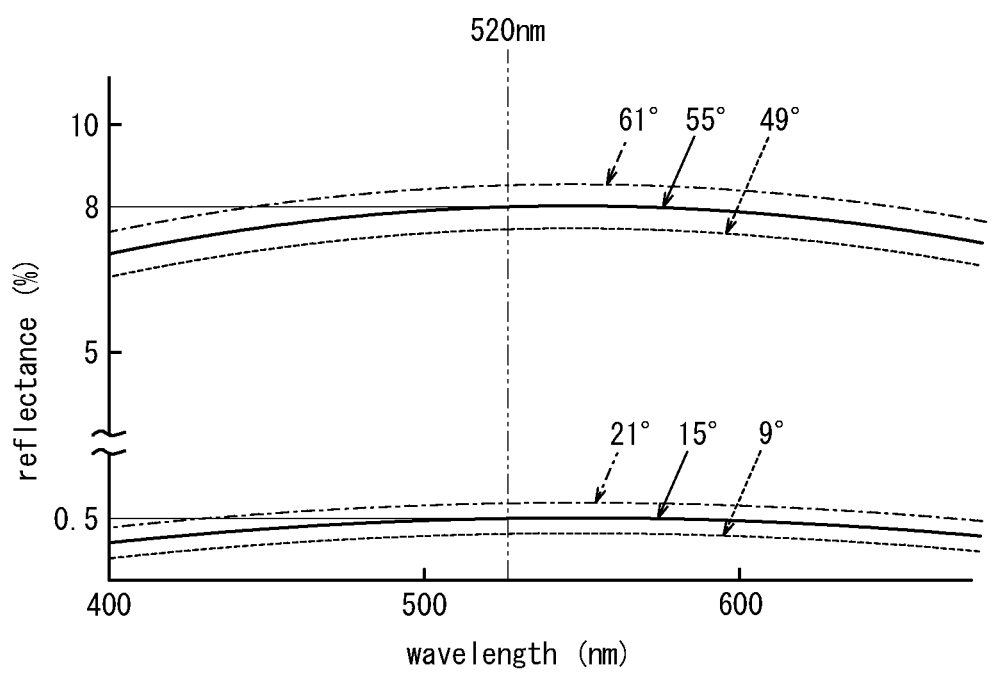
FIG. 7 shows exemplary reflectance characteristics of the beam splitting film.

FIG. 7 shows exemplary reflectance characteristics of the beam splitting film 28 of BS film type A. The reflectance characteristics of FIG. 7 are shown with respect to an incident angle 55° and incident angles of 55°±6°, i.e., 61° and 49°, an incident angle 15° and incident angles of 15°±6°, i.e., 21° and 9°. Here, lights at the incident angles of 55°, 61°, and 49° are mainly reflected, after having been incident on the beam splitting film 28, so as to be taken outside of the light guide part 25. Lights at the incident angles of 15°, 21°, and 9° mainly pass through the beam splitting film 28, after having been incident on the beam splitting film 28, so as to be propagated toward the leading end of the light guide part 25.

Next, the size of the second input deflection part 36 of the second propagation optical system 22 is described with reference to FIGS. 4, 8, and 9. The exit pupil copied in the x-direction by the second propagation optical system 22 may suffer luminance unevenness depending on the observation position within the emitting region and the angle of image light according to the object height. In order to reduce such unevenness in luminance, the second output deflection part 37 may desirably be filled with image light reflected by the second input deflection part 36 to be incident on the second light guide part 35.

As illustrated in FIG. 4, among the light beams reflected by the second input deflection part 36 and incident on the first plane S21 of the second light guide part 35, those incident along the x-direction closer to the second input deflection part 36 than to the end face E1 of the second input deflection part 36 are reflected by the second input deflection part 36 to be incident on the second output deflection part 37. Here, of the light beams reflected by the second input deflection part 36 to be incident on the first plane S21, the light beam closest to the end face E1 is defined as a first light beam b1.

Further, light beams reflected by the second input deflection part 36 and further subjected to total reflection on the second plane S22 of the second light guide part 35 to reach the second output deflection part 37 are those along the x-direction reaching closer to the second output deflection part side 37 than to the end face E1 of the second input deflection part 36 after the total refection on the second plane S22. Here, of the light beams sequentially subjected to total reflection on the second input deflection part 36 and the second plane S22 of the second light guide part 35 to reach the second output deflection part 37, the light beam farthest from the end face E1 is defined as second light beam b2.

On the second plane S22, the region defined by the loci of the first light beam b1 and the second light beam b2 has a width Dx in the x direction, which is given by Equation (1):

$$Dx = 2 \times T1 \times \tan(\theta v1_{y0}) \quad (1)$$

In Equation (1), $\theta v1_{y0}$ represents the incident angle of a light flux in the y-direction at zero object height, with respect to the second plane S22 within the second light guide part 35. T1 represents the thickness of the second light guide part 35, i.e., the length thereof in the z-direction.

Further, at an input-side bonding plane S23 of the second input deflection part 36, the region defined by the loci of the first light beam b1 and the second light beam b2 included in the light flux with the incident angle $\theta v1_{y0}$ has a width Bxx (see FIG. 8) which is given by Equation (2).

$$Bxx = Dx \times \cos(\theta v1_{y0}) = 2 \times T1 \times \sin(\theta v1_{y0}) \quad (2)$$

The incident angle $\theta v1_{y0}$ varies, depending on the x-direction position of the LCD panel 15, according to the object height incident via the first propagation optical system 21.

Figure 8:
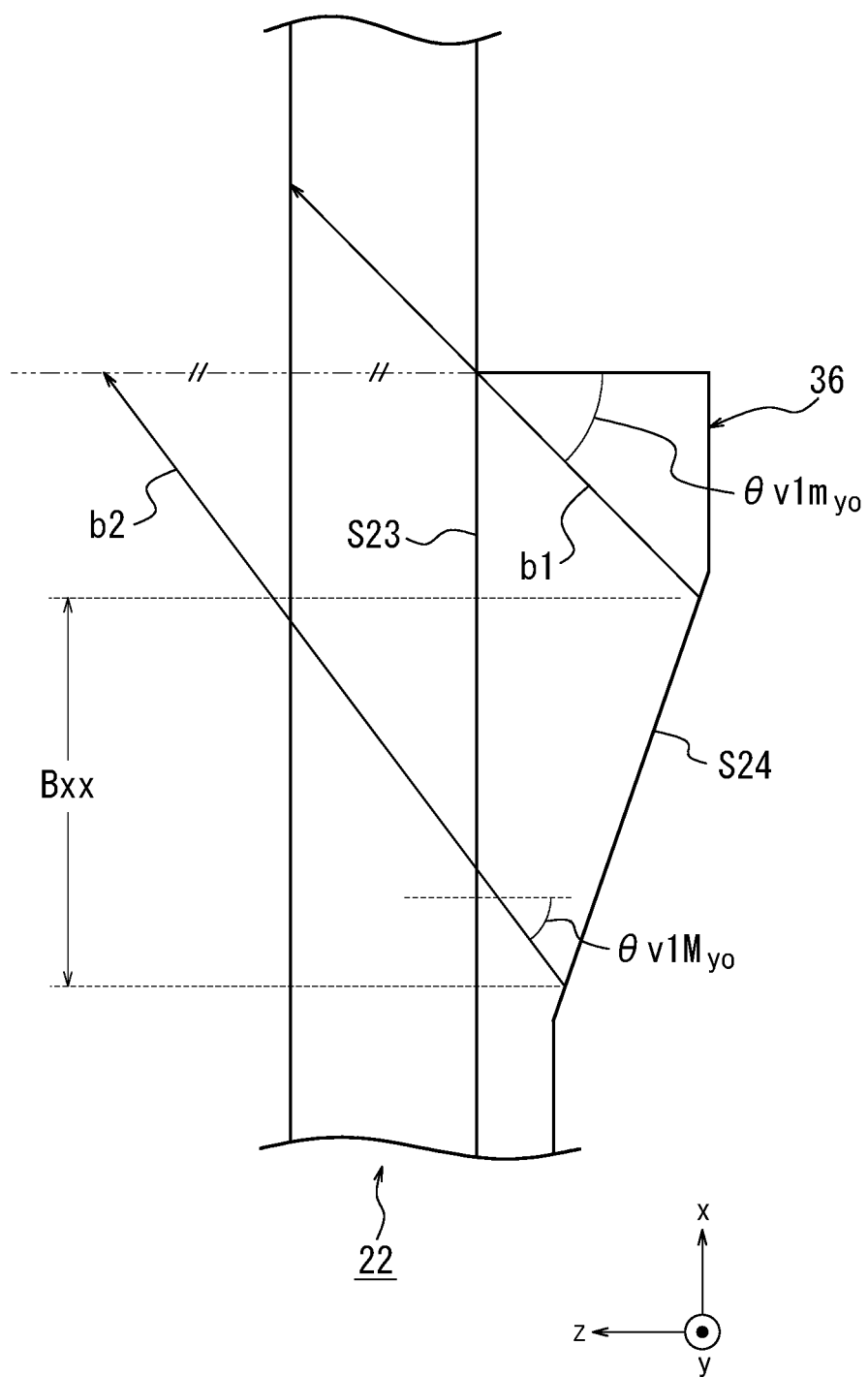
FIG. 8 is an explanatory view of light beams that can be emitted to the second output deflection part.
Figure 9:
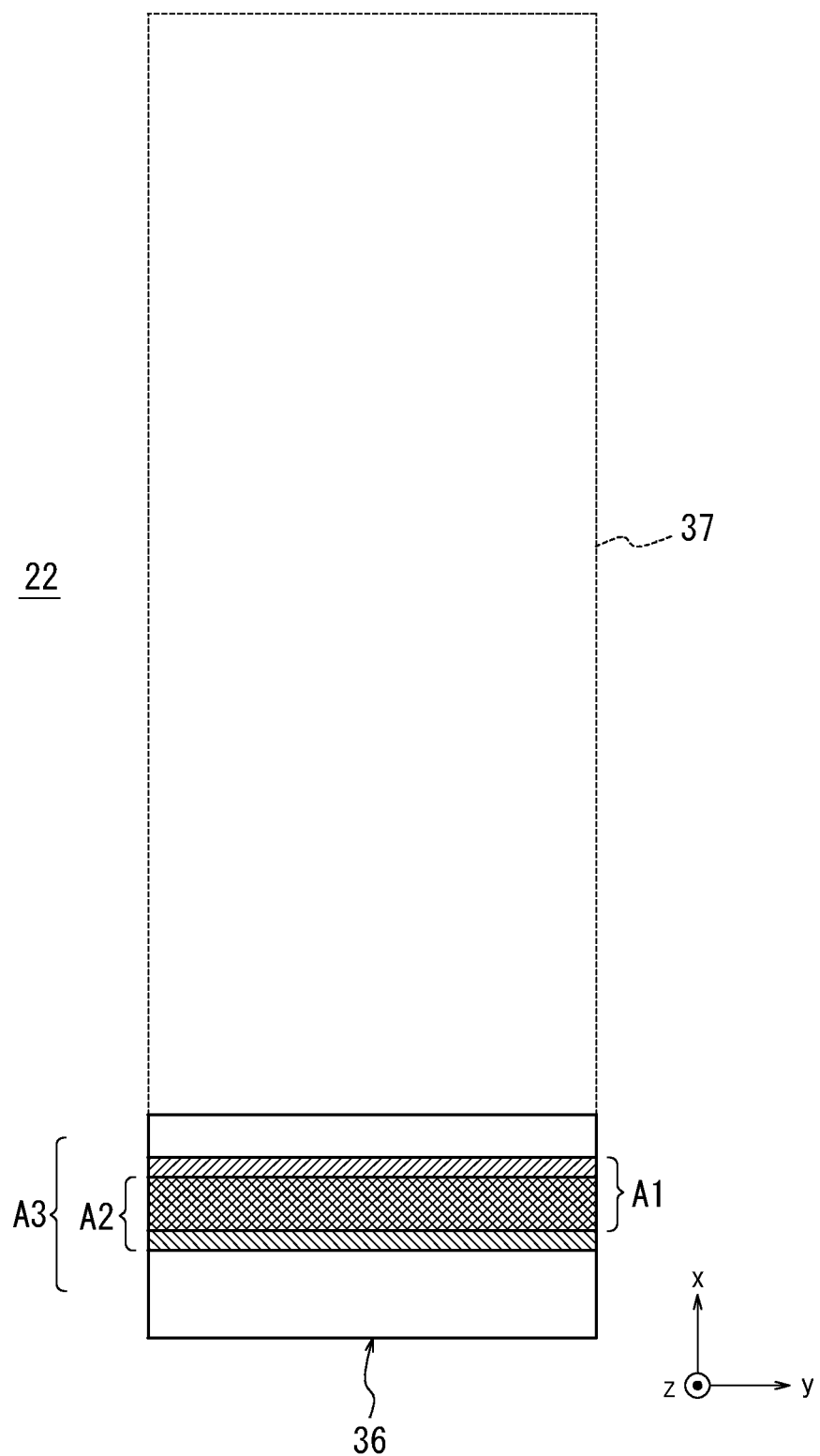
FIG. 9 shows a transmission region on an input-side bonding plane, defined by a light flux with a minimum incident angle and a light flux with a maximum incident angle relative to a slope of the second input deflection part.

Here, in FIG. 8, a light flux forming the minimum incident angle to the slope S24 of the second input deflection part 36 has an incident angle $\theta v1 m_{y0}$ to the input-side bonding plane S23, and includes the first light beam b1 and the second light beam b2, which define, by the loci thereof, a first region A1 of FIG. 9. A light flux forming the maximum incident angle to the slope S24 of the second input deflection part 36 has an incident angle $\theta v1 M_{y0}$ to the input-side bonding plane S23, and includes the first light beam b1 and the second light beam b2, which define, by the loci thereof, a second region A2 of FIG. 9.

In order to reduce luminance unevenness, the first region A1 to the second region A2 may preferably be filled with a light flux of image light. To meet such condition, the slope S14 may be provided as opposed to a larger region A3 including the first region A1 and the second region A2, and an exit pupil may desirably be projected across the entirety of the first region A1 and the second region A2.

Here, the first propagation optical system 21 enlarges the exit pupil of the projection part 16 in the y-direction so as to fill the region A3 of FIG. 9 with image light, so as to cause image light to be incident on the second propagation optical system 22.

Next, the size of the third input deflection part 46 of the third propagation optical system 23 is described with reference to FIGS. 5 and 10. The exit pupil copied by the third propagation optical system 23 may suffer luminance unevenness depending on the observation position within the emitting region (projection region PA) of the second plane S32 of the third light guide part 45 and the angle of image light according to the object height. In order to reduce such unevenness in luminance, the third output deflection part 47 may desirably be filled with image light reflected by the third input deflection part 46 and caused to incident on the third light guide part 45, as in the second propagation optical system 22.

Figure 5:
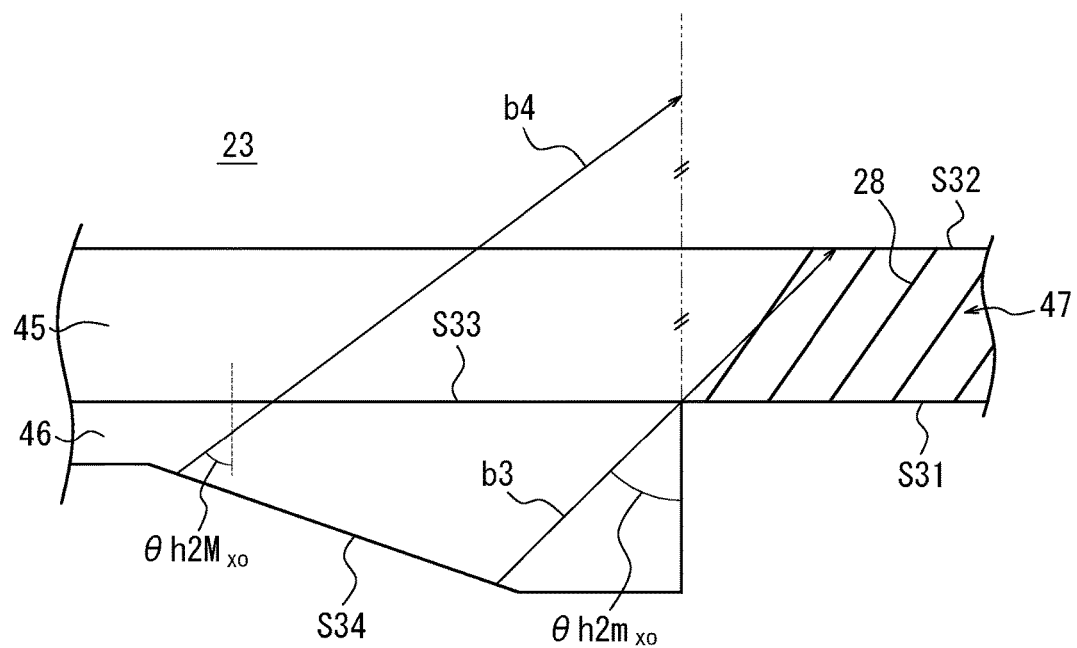
FIG. 5 is an explanatory view of the third propagation optical system.
Figure 10:
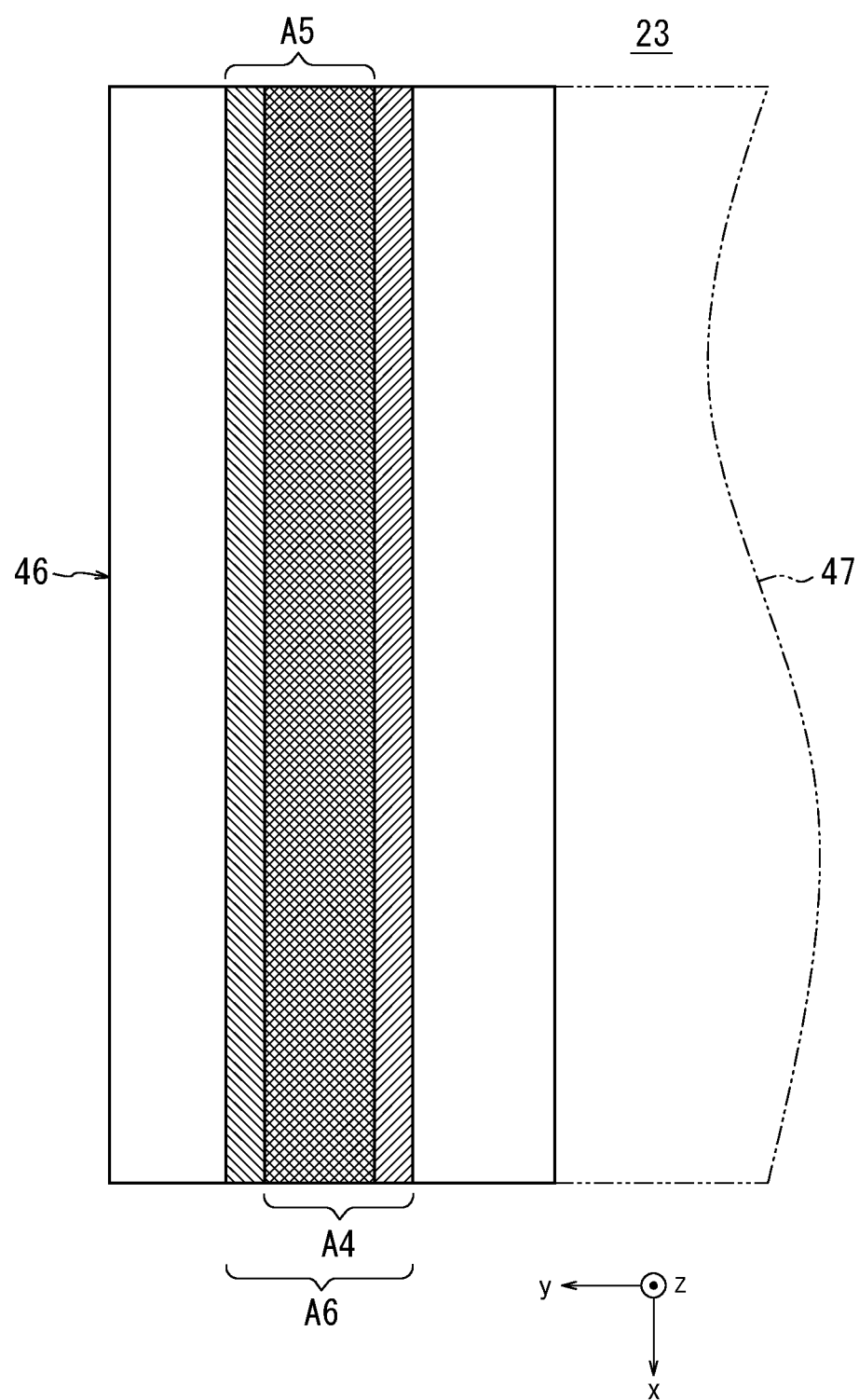
FIG. 10 shows a transmission region on an input-side bonding plane, defined by a light flux with a minimum incident angle and a light flux with a maximum incident angle relative to a slope of the third input deflection part.

As in the case of the second propagation optical system 22, in FIG. 5, a light flux forming the minimum incident angle to the slope S34 of the third input deflection part 46 has an incident angle $\theta h2 m_{x0}$ along the y-direction toward the input-side bonding plane S33, and includes the first light beam b3 and the second light beam b4, which define, by the loci thereof, a first region A4 of FIG. 10. Also, a light flux forming the maximum incident angle to the slope S34 of the third input deflection part 46 has an incident angle $\theta h2 M_{x0}$ along the y-direction toward the input-side bonding plane S33, and includes the first light beam b3 and the second light beam b4, which define, by the loci thereof, a first region A5 of FIG. 10.

In order to reduce luminance unevenness, the first region A4 to the second region A5 may preferably be filled with a light flux of image light. To meet such condition, the slope S14 may be provided as opposed to a larger region A6 including the first region A4 and the second region A5, and an exit pupil may desirably be projected across the entirety of the first region A4 and the second region A5.

The first propagation optical system 21, the second propagation optical system 22, and the third propagation optical system 23 are formed such that the first light guide part 25 and the second light guide part 35 each have the y-direction length larger than the y-direction length of the third input deflection part 46, in order to project the exit pupil across the entirety of the first region A4 and the second region A5. Here, the y-direction length of the third input deflection part 46 refers to the length of the slope S34 of the third input deflection part 46 along the y-direction.

Further, in order to project the exit pupil across the entirety of the first region A4 and the second region A5, the first propagation optical system 21, the second propagation optical system 22, and the third propagation optical system 23 are formed to satisfy the following conditions.

Figure 11:
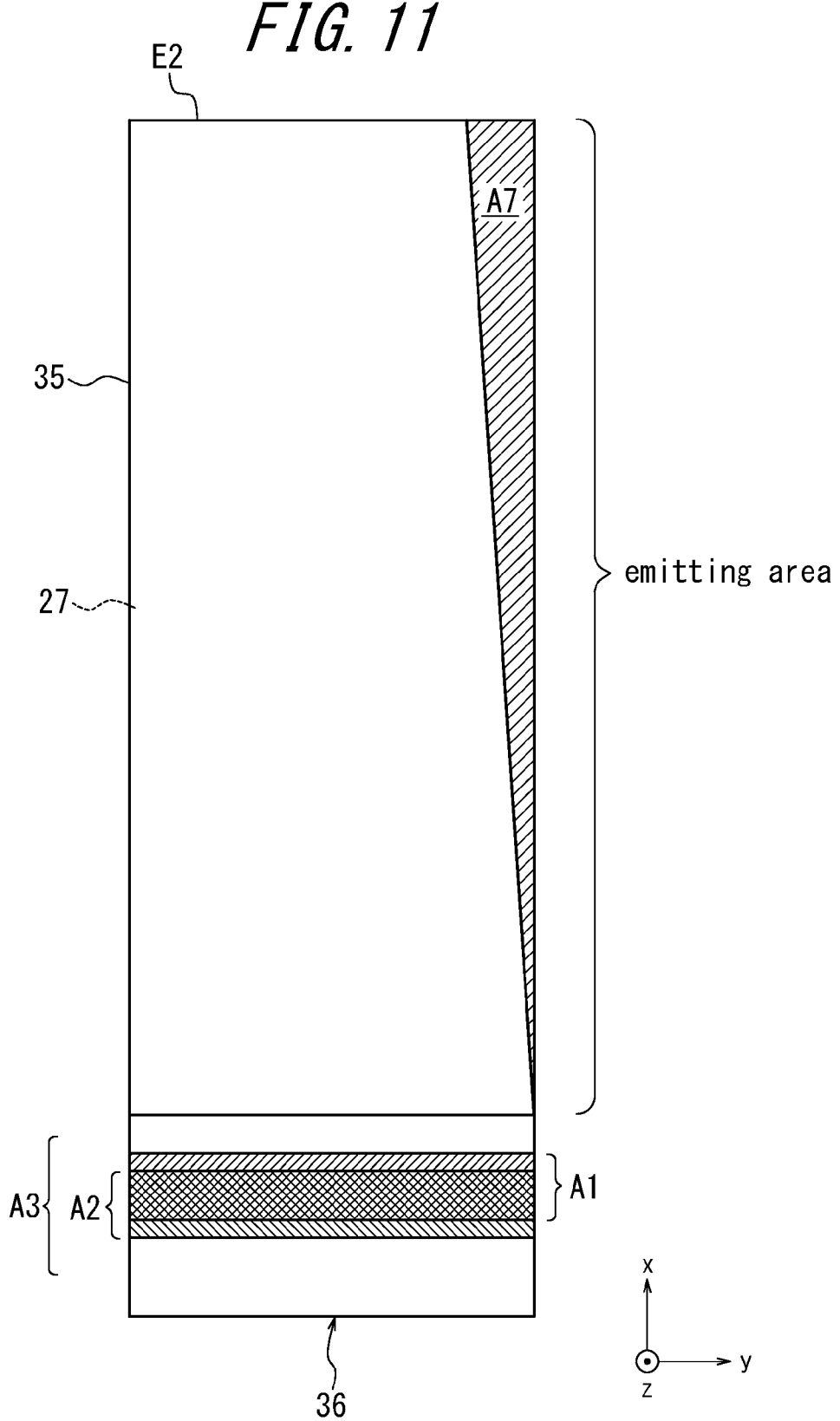
FIG. 11 shows a plane perpendicular to the z-direction, having a locus of a light flux projected thereon, the light flux having the y-direction angular component according to the object height and propagated through the second light guide part.

In the LCD panel 15, when a light flux corresponding to a pixel displaced in the y-direction from the optical axis, i.e., a parallel light flux having a y-direction angular component according to the object height, is incident on the second propagation optical system 22 via the first propagation optical system 21, the light flux is propagated, as illustrated in FIG. 11, in a direction tilted from the x-direction by an angle corresponding to the angular component, and emitted from the emitting region to the third propagation optical system 23. Accordingly, when the parallel light flux reaches the end E2 on the second output deflection part 37 side of the second light guide part 35, the light flux is not emitted from a region A7 as part of the emitting region. Thus, in the third propagation optical system 23, in order to project the exit pupil across the entirety of the first region A4 and the second region A5 of the input-side bonding plane S33 of the third input deflection part 46, the parallel light flux that has reached the end E2 of the second propagation optical system 22 in FIG. 11 needs to overlap across the entirety of the first region A4 and the second region A5 of the input-side bonding plane S33 of the third input deflection part 46 of the third propagation optical system 23. The conditions for allowing the both to overlap each other are described in below.

As illustrated in FIG. 12, in the second propagation optical system 22, a parallel light flux having a y-direction angular component according to the object height is incident through the first propagation optical system 21. In this case, when the projection of the barycenter of the light flux to the second plane S22 forms an angle $\varphi$ with a straight line parallel in the x-direction, a shift amount S of light flux along the y-direction upon reaching the end E2 is calculated by Equation (3).

$$S = Wx1 \times \tan \varphi \qquad (3)$$

The second light guide part 35 is formed like a parallel plate as described above, and thus, the propagation angles in the x-direction and y-direction are kept within the second light guide part 35. Accordingly, in FIG. 12, a line segment LS folded by the reflection within the second light guide part 35 may linearly be extended in simulation, to thereby calculate the shift amount in the y-direction with respect to the propagation position in the x-direction. Thus, in order to simplify the relation between the shift amount S and the angle of image light according to the object height, the locus of light beam propagated in the x-direction through the reflection within the second light guide part 35 is linearly extended for illustrative purpose.

The light flux to serve as the barycenter of a parallel light flux having a y-direction angular component according to the object height is incident onto the second light guide part 35 from the second input deflection part 36 to pass through a starting point SP, and the linearly-extended locus of the light beam reaching the end E2 reaches an end point EP. A right triangle RT1 having, as one side thereof, a straight line L1 having a length Wx3 and extending from the end point EP to the opposite side in the x-direction, and the line connecting the starting point SP and the end point EP of the locus as the other side thereof has a vertical angle $\theta v1$ at the starting point SP, the vertical angle $\theta v1$ satisfying Equation (4).

$$\sin(\theta v1) = 2 \times \cos\theta \times \cos\varphi \times \sin\theta = \cos\varphi \times \sin(2 \times \theta) \qquad (4)$$

In Equation (4), θ represents an angle formed by the y-direction angular component of an incident angle within the second light guide part 35, of the y-direction angular component according to the object height in the image light, relative to the normal of the slope S14 of the second input deflection part 36. Further, φ represents an angle formed by the y-direction angular component of an incident angle within the second light guide part 35, of the y-direction angular component according to the object height in the image light, relative to a straight line parallel in the z-direction. In a range where φ is small, cos φ is approximated to 1, which thus approximates θv1 to θ.

Here, a right triangle RT2 having, as one side thereof, a straight line L2 having a length S and extending in the y-direction from the end point EP, and the line connecting the starting point SP and the end point EP of the locus as the other side thereof has a vertical angle θh1 at the starting point SP, and the vertical angle θh1 corresponds to the x-direction angular component of an incident angle within the second light guide part 35, of the x-direction component according to the object height in the image light.

Here, the line segment connecting the starting point SP and the end point EP may be defined as follows:

$$\overline{AB}$$

In this case, the x-direction length Wx3 of the emitting region of the second light guide part 35 is calculated from Equation (5). Then, the shift amount S is calculated from Equation (6).

$$Wx1 = \overline{AB} \times \sin(\theta v1) \tag{5}$$

$$S = \overline{AB} \times \sin(\theta h1) \tag{6}$$

Accordingly, tan φ(=S/Wx1) in Equation (3) may be calculated from Equations (5), (6), to thereby obtain Equation (7).

$$S = Wx1 \times \left[ \frac{\sin(\theta h1)}{\sin(\theta v1)} \right] \tag{7}$$

According to Equation (7), the shift amount S depends on the angle according to the object height of the image light, and increases along with the decrease of θv1 and/or of the increase of θh1. Therefore, defining the minimum value of θv1 and the maximum value of θh1 as θv1m and θh1M, respectively, which are determined by the configuration of the LCD panel 15 and of the first propagation optical system 21, the maximum shift amount SM is calculated from Equation (8).

$$SM = Wx1 \times \left[ \frac{\sin(\theta h1M)}{\sin(\theta v1m)} \right] \tag{8}$$

Figure 13:
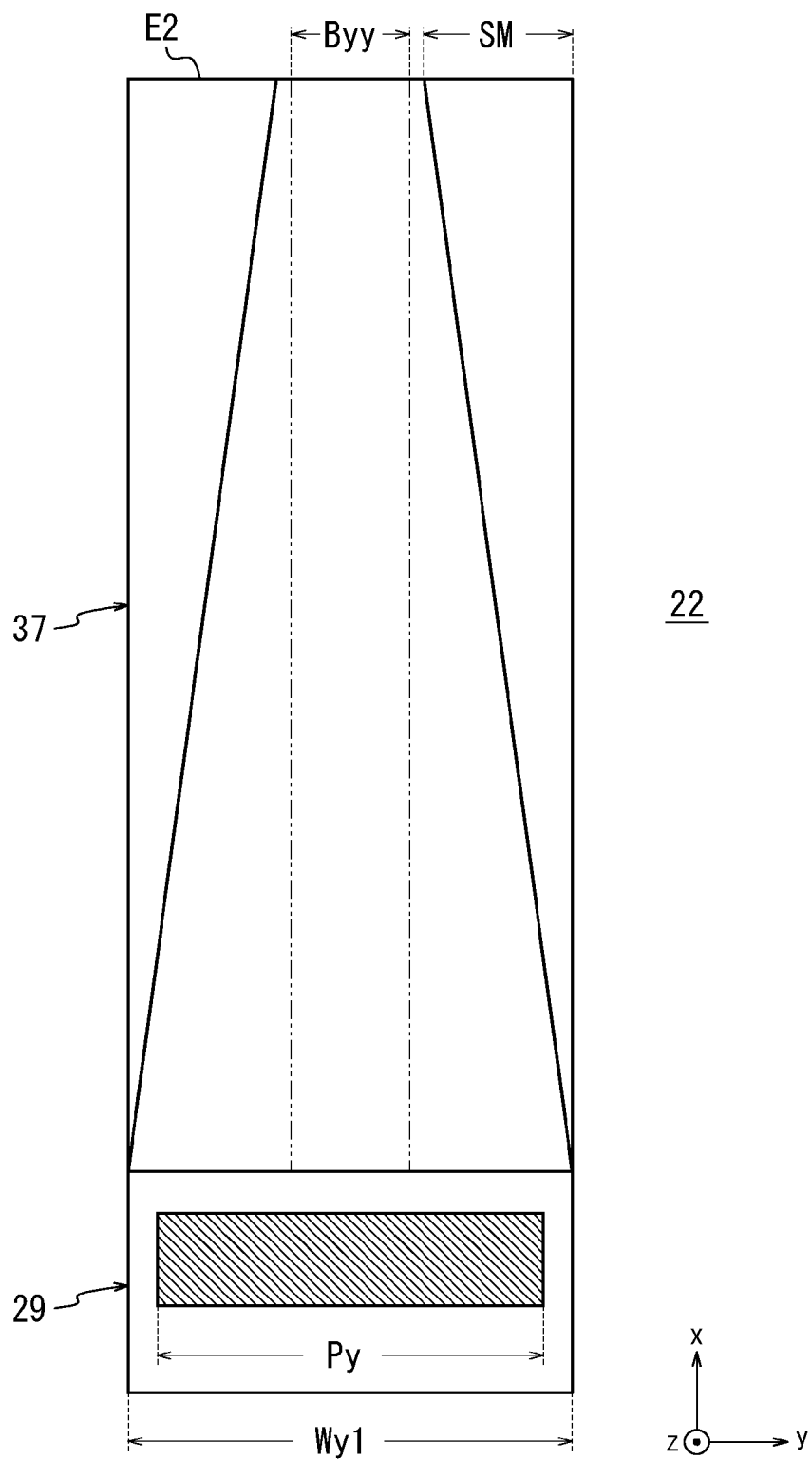
FIG. 13 is for illustrating the sizes of: the second input deflection part; the second output deflection part; and the third input deflection part.

As illustrated in FIG. 13, a parallel light flux to be emitted from the second input deflection part 36 of the second propagation optical system 22 to the second light guide part 35 is shifted by the magnitude of SM at maximum in both directions along the y-direction at the end E2 on the second output deflection part 37 side. Therefore, in order to reduce luminance unevenness of image light observed in the emitting region of the third propagation optical system 23, Equation (9) may preferably be satisfied, where Py represents the y-direction light flux width of an exit pupil incident on the second input deflection part 36 and Byy represents the y-direction width of a region that should be filled with the light flux to be incident on the input-side bonding plane S33 of the third input deflection part 46 of the third propagation optical system 23.

$$Py > Byy + 2 \times SM \tag{9}$$

Further, the y-direction length Wy2 of the second propagation optical system 22 is required to satisfy Equation (10) in order to receive the entire region of a light flux having the y-direction light-flux width Py.

$$Wy1 > Py > Byy + 2 \times SM \tag{10}$$

Byy is calculated from Equation (11), similarly to Bxx in the second propagation optical system 22.

$$Byy = 2 \times T2 \times \sin(\theta h2) \tag{11}$$

Expressions (8) and (11) may be substituted into Expression (10) to obtain Expression (12).

$$Wy1 > 2 \times T2 \times \sin(\theta h2) + 2 \times Wx1 \times \left[ \frac{\sin(\theta h1M)}{\sin(\theta v1m)} \right] \tag{12}$$

The first input deflection part 25 and the second input deflection part 36 may be designed to have sizes that satisfy Expression (12) and formed accordingly, to thereby reduce luminance unevenness due to the observation position within the emission region of the second plane S32 in the third propagation optical system 23 and to the angle of image light according to the object height.

According to the disclosed display device 10 of Embodiment 1, the exit pupil of the projection optical system 11 is enlarged in the y-direction by the first propagation optical system 21. Therefore, as compared with an exemplary case of using, for example, a lenticular lens or a cylindrical lens to obtain a rectangular image light longer in the y-direction light flux width rather than in the x-direction, the projection optical system 11 can be made compact, which readily allows the display device 10 to be reduced in size and thickness. Further, the y-direction light flux width of image light enlarged in the y-direction and emitted by the first propagation optical system 21 and the y-direction length of the second light guide part 35 of the second propagation optical system 22 receiving image light incident from the first propagation optical system 21 are both larger than the y-direction length of the third input deflection part 46 of the third propagation optical system 23, which thus allows for reducing luminance unevenness in the image light observed from the third propagation optical system 23. Further, the second propagation optical system 22 enlarges a light flux in a direction orthogonal to the directions in which the first propagation optical system 21 and the third propagation optical system 23 each enlarge light fluxes, which allows for efficiently enlarging the exit pupil of the projection optical system 11. Further, the projection optical system 11 is disposed extending substantially parallel to the emitting plane of image light in the third propagation optical system 23, which allows the display device 10 to be further reduced in size and thickness.

Further, the first propagation optical system 21, the second propagation optical system 22, and the third propagation optical system 23 are configured to satisfy Equation (12), which allows for further reducing luminance unevenness in image light observed from the third propagation optical system 23.

Embodiment 2

The disclosed display device 10 of Embodiment 2 is different from the display device 10 of Embodiment 1 mainly in that the first output deflection part 27, the second output deflection part 37, and the third output deflection part 47 constituting the first propagation optical system 21, the second propagation optical system 22, and the third propagation optical system 23, respectively, are each configured to to have a beam splitting film and a prism array.

Figure 14:
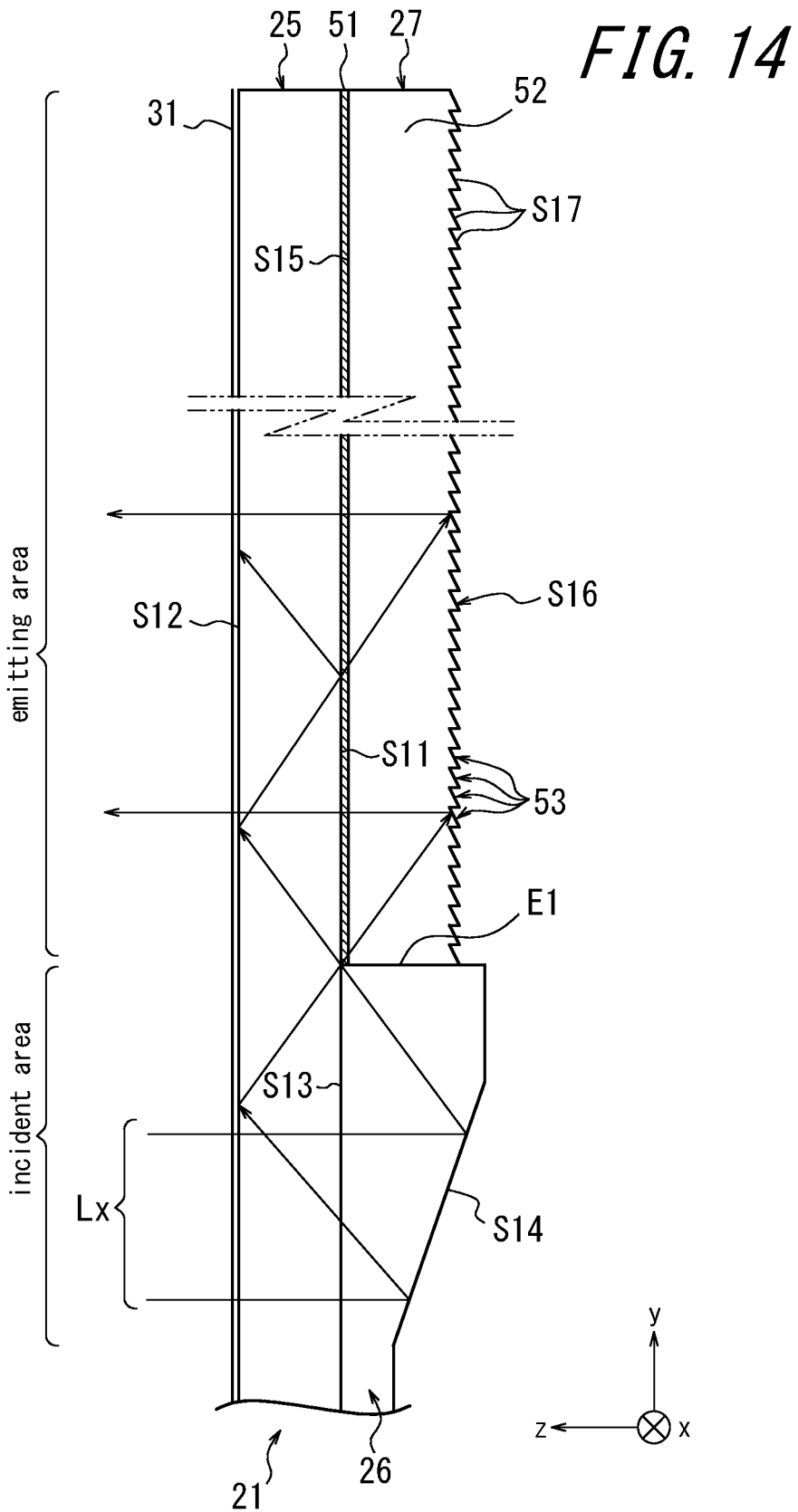
FIG. 14 illustrates a schematic configuration of the first propagation optical system in the disclosed display device of Embodiment 2.

FIG. 14 illustrates a schematic configuration of the first propagation optical system 21 in the disclosed display device of Embodiment 2. In FIG. 14, the first light guide part 25 is made of, for example, quartz formed like a transparent parallel plate extending in the y-direction as having the first plane S11 and the second plane S12 parallel and opposing to each other. The first output deflection part 27 is bonded, on the first plane S11 of the first light guide part 25, to a region other than the region where the first input deflection part 26 is bonded.

The first output deflection part 27 includes: a beam splitting film 51; and a transmissive plate-like transparent member 52, having, as plate faces, an output-side bonding plane S15 and a triangular prism array plane S16 formed with a triangular prism array. The beam splitting film 51 may be formed, for example, onto the first plane S11 of the first light guide part 25 through evaporation. The first light guide part 25, when made of quartz, is heat-resistant against the heat for evaporating the beam splitting film 51, which is advantageous in that it becomes less susceptible to warpage due to the stress applied to the film. The plate-like transparent member 52 is bonded to the beam splitting film 51 at the output-side bonding plane S15 via a transparent adhesive. Here, as described later, the beam splitting film 51 may preferably be formed so as to be slightly extruded on the incident region side.

The beam splitting film 51 is formed of a multi-layered film designed to pass through light incident from a substantially vertical direction, reflects most of light obliquely incident, and passes the rest therethrough. The multilayered film thus configured has low-pass or band-pass spectral reflectance characteristics.

Figure 15:
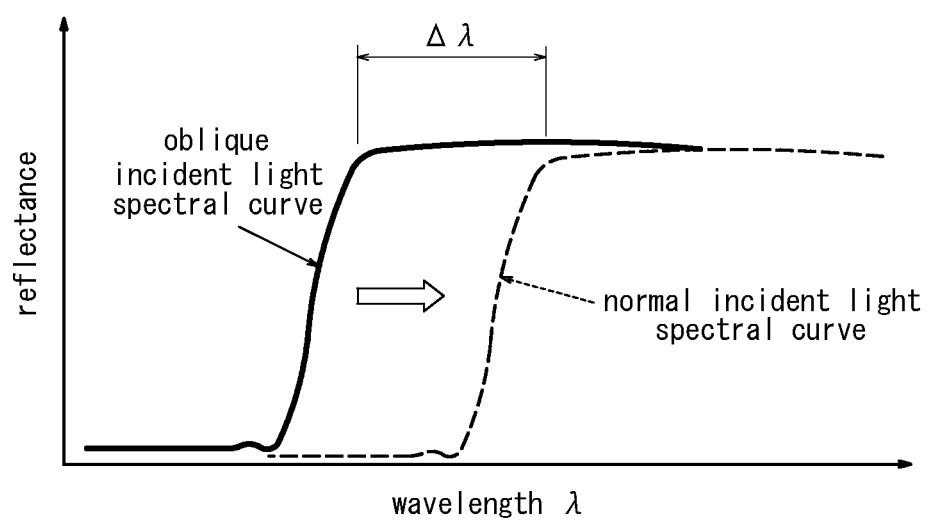
FIG. 15 is a graph for illustrating spectral curves of the thin film which have the property of shifting in the wavelength direction according to the incident angle.

As has been hitherto known, in thin films, a spectral curve is shifted in the wavelength (λ) direction according to the incident angle. As illustrated in FIG. 15, the spectral curve (broken line) for substantially-vertical incident light is shifted by Δλ to the long-wavelength side from the spectral curve (solid line) for oblique incident light. Therefore, the beam splitting film 51 may be formed by combining the wavelength λ of the incident light flux Lx and the setting of the thin film, such that the film may be disposed between the cutoff wavelengths of both the spectral curve for obliquely-incident light and the spectral curve for substantially-vertical incident light and have a reflectance of 95% to the oblique incident light and a reflectance of 0% to the substantially-vertical incident light.

Figure 16:
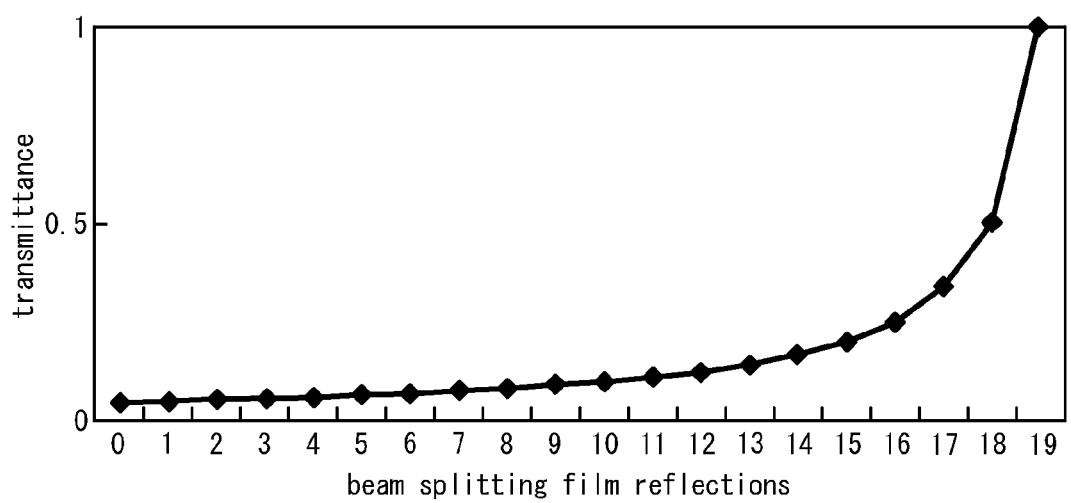
FIG. 16 is a graph showing transmittance characteristics according to the distance from the incident region on the beam splitting film.

Further, the beam splitting film 51 has a feature in that the transmittance to obliquely-incident light varies according to the position along the light guide part direction of image light in the first light guide part 25. Therefore, as illustrated in FIG. 16, for example, the beam splitting film 51 may preferably be formed so as to have transmittance that increases in geometric progression according to the distance from one end on the first input deflection part 26 side. To form such film through evaporation, for example, the first light guide part 25 may be disposed such that the distance from the evaporation source may vary depending on the distance on the plane from the first input deflection part 26, and may be designed in advance to have a desired reflectance property at each position according to the difference in distance (difference in film thickness to be formed), to thereby allow the film formation.

In FIG. 14, an antireflection film 31 is formed on the second plane S22 of the first light guide part 25. The antireflection film 31 suppresses reflection of image light incident from a substantially vertical direction. The antireflection film 31 is formed to have a film stress balanced with the film stress of the beam splitting film 51. With the film stress being balanced with each other, the distortion of the first propagation optical system 21 can be suppressed, which can contribute to excellent propagation of image light.

The plate-like transparent member 52 constituting the first output deflection part 27 is formed of acryl having a thickness of, for example, 3 mm. The triangular prism array formed on the plate-like transparent member 52 is so minute that the array is formed through injection molding. In light thereof, acryl is selected as an example as an injection-formable transparent medium. The triangular prism array plane S16 is evaporated with aluminum and serves as a reflective film. The triangular prism array of Embodiment 2 is made of acryl, but not limited to an acrylic resin. However, in the case of bonding to a film, such as the beam splitting film 51, having characteristics in a polarization direction in one direction at a plane, any material capable of suppressing generation of birefringence within the material and the molding condition may preferably be taken into consideration.

The first output deflection part 27 has, on the triangular prism array plane S16 thereof, a plurality of triangular prisms 53 formed as extending in a direction (x-direction) orthogonal to the propagation direction (y-direction) of image light in the first light guide part 25. The plurality of triangular prisms 53 are formed like saw tooth at pitches of, for example, 0.9 mm along the propagation direction (y-direction) of image light in the first light guide part 25.

The slope S17 of each triangular prism 53 has an inclination angle with respect to the output-side bonding plane S15 which extends in a direction opposite to the slope S14 of the first input deflection part 26. That is, the normal of the slope S17 extends to the incident region side of the first light guide part 25. Further, the inclination angle of each triangular prism 53 has an absolute value that is substantially equal to the inclination angle of the slope S14, or may be different in a range of several degrees depending on the combination of the first input deflection part 26, the first light guide part 25, and the material of the plate-like transparent member 52 of the first output deflection part 27. Here, prisms adjacent to each other within the triangular prism array plane S16 have an angular difference of 0.01° (0.5 part) or less.

The inclination angle of the triangular prism 53 is determined based on the critical angle in the second plane S12 of the first light guide part 25, similarly to the inclination angle of the slope S14 of the first input deflection part 26. In Embodiment 2, the inclination angle of the triangular prism 53 is, for example, 25°. The rest of the configuration is similar to that of the first propagation optical system 21 in Embodiment 1.

In the first propagation optical system 21 of FIG. 1, the light flux Lx vertically incident on the incident region of the second plane S12 is reflected by the slope S14 of the first input deflection part 26, to be obliquely incident on the emitting region of the second plane S12 within the first light guide part 25. The obliquely-incident light flux Lx is incident on the second plane S12 at an angle larger than the critical angle, and totally reflected. The totally-reflected light flux Lx is obliquely incident on the beam splitting film 51, and passes therethrough in an amount at a predetermined ratio, with the rest being reflected. The light flux Lx reflected by the beam splitting film 51 is again incident on the second plane S12 at an angle larger than the critical angle and totally reflected. Thereafter, the the light flux Lx is repeatedly subjected to the partial reflection on the beam splitting film 51 and to the total reflection on the the second plane S12, so as to be propagated in the y-direction of the first light guide part 25.

Each time the light flux Lx is incident on the beam splitting film 51, the light flux Lx passes therethrough at a predetermined ratio to be incident on the triangular prism 53. The light flux Lx incident on the triangular prism 53 is again deflected by the reflective film of the slope S17 of the triangular prism 53 in a direction perpendicular to the second plane S12 of the first light guide part 25. The light flux Lx deflected in a direction perpendicular to the second plane S12 passes through the beam splitting film 51 at the transmittance of substantially 100%, and is emitted outside from the second plane S12.

The second propagation optical system 22 and the third propagation optical system 23 are configured similarly to the first propagation optical system 21 of FIG. 14.

The display device of Embodiment 2 provides the same effect as in Embodiment 1. Further, according to Embodiment 2, the end face E1 of the first input deflection part 26 of the first propagation optical system 21, that is, an interface between the first input deflection part 26 and the plate-like transparent member 52 constituting the first output deflection part 27 is colored black and the beam splitting film 51 is slightly extruded to the incident region side. The second propagation optical system 22 and the third propagation optical system 23 are also similarly configured. This configuration suppresses stray light of high luminance and generation of luminance unevenness. In below, the first propagation optical system 21 is explained by way of example.

In the first propagation optical system 21, only the light that has passed through the beam splitting film 51 is caused to penetrate into the first output deflection part 27, to thereby suppress stray light of high luminance and generation of luminance unevenness.

Figure 17:
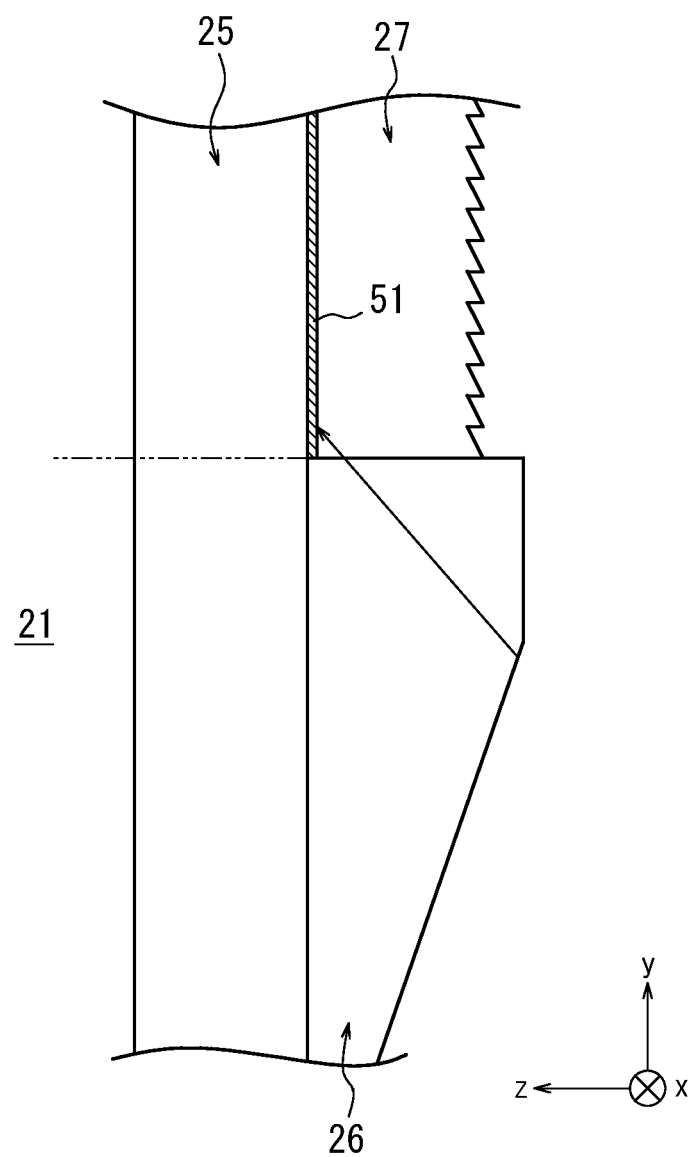
FIG. 17 is an explanatory view of a locus of light, with no coating layer provided at the interface between the second input deflection part and the second output deflection part.

Meanwhile, as illustrated in FIG. 17, in the case where the interface between the first input deflection part 26 and the first output deflection part 27 is capable of transmitting light, light may directly penetrate into the first output deflection part 27 from the first input deflection part 26 without passing through the beam splitting film 51. Accordingly, in Embodiment 2, as illustrated in FIG. 18, a black coating layer 54 is formed at the interface between the first input deflection part 26 and the first output deflection part 27, to thereby prevent direct penetration of light from the first input deflection part 26 into the first output deflection part 27, allowing for suppressing stray light of high luminance and generation of luminance unevenness.

Figure 18:
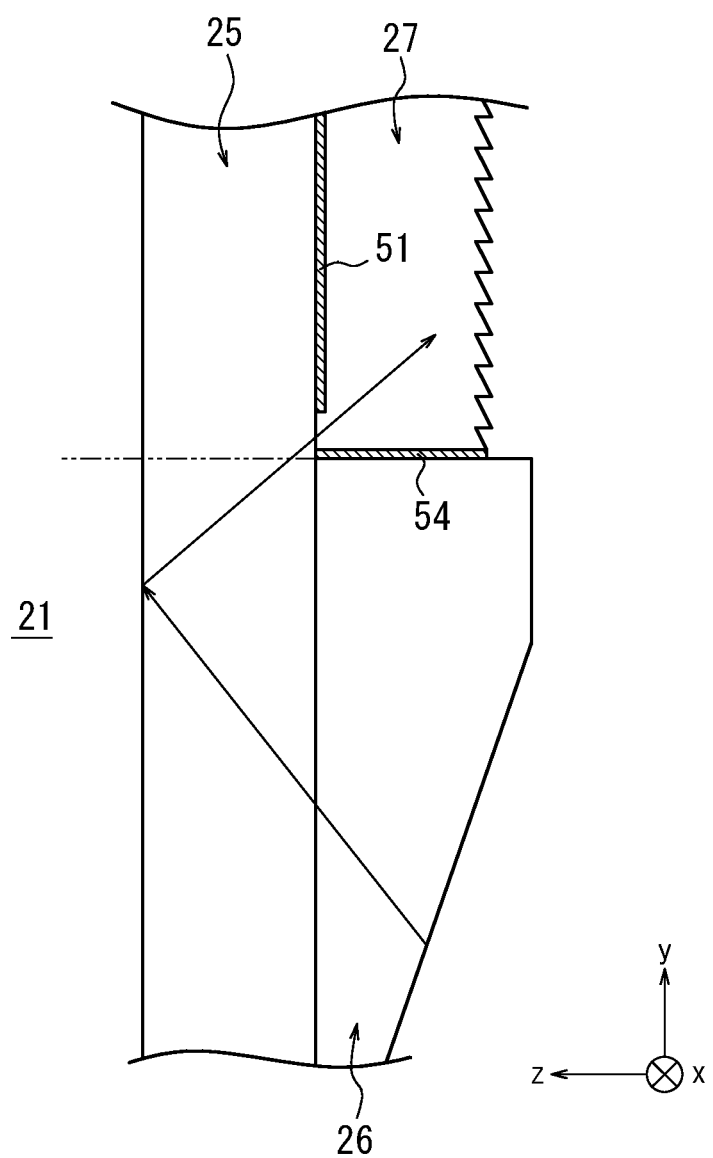
FIG. 18 is an explanatory diagram of a locus of light, with no beam splitting film formed on the edge of the emitting region.

Further, as illustrated in FIG. 18, if the coating layer 54 and the beam splitting film 51 have a gap therebetween, image light may pass through the gap to penetrate into the plate-like transparent member 52 without passing through the beam splitting film 51. In light thereof, in Embodiment 2, the beam splitting film 51 is disposed so as to be slightly extruded on the incident region side, which provides fabrication tolerance to reduce a gap to be formed between the coating layer 54 and the beam splitting film 51, to thereby suppress stray light of high luminance and generation of luminance unevenness.

Further, in the display device of Embodiment 2, the first input deflection part 26 is formed of a single prism having a single slope S14, and thus, light may be incident on the whole region of each prism portion to be reflected without suffering vignetting which is otherwise caused by a side wall of a prism portion on the first output deflection part 27 side as in the prism array of the first output deflection part 27. Thus, the light can be used with efficiency. Further, in Embodiment 2, light to be incident on the first input deflection part 26 may be reduced in the x-direction width by an amount of the light flux width that may suffer vignetting in the prism array.

Embodiment 3

In Embodiment 3 disclosed herein, the light source 13 constituting the projection optical system 11 in the display device 10 of Embodiment 1 is formed of a single laser light source emitting G light with a wavelength of, for example, 532 nm. Further, the first output deflection part 27, the second output deflection part 37, and the third output deflection part 47 each constituting the first propagation optical system 21, the second propagation optical system 22, and the third propagation optical system 23, respectively, are each configured with a beam splitting film and a grating.

Figure 19:
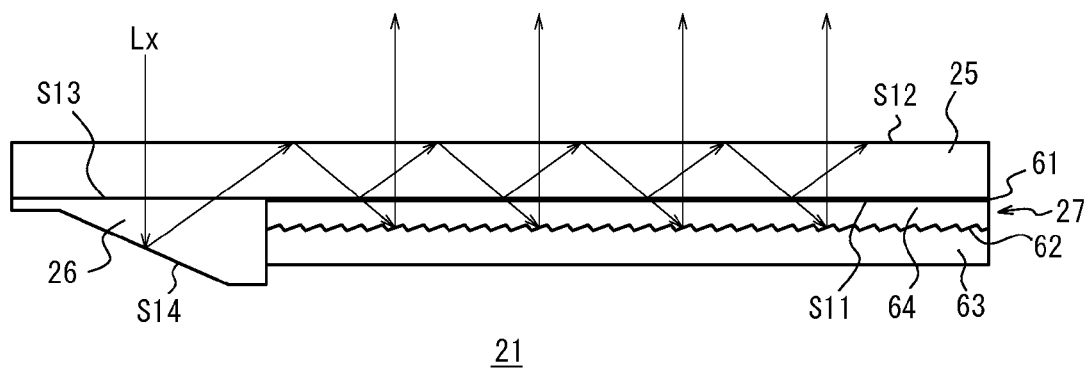
FIG. 19 illustrates a schematic configuration of the first propagation optical system in the disclosed display device of Embodiment 3.

FIG. 19 illustrates a schematic configuration of the first propagation optical system 21 in the disclosed display device of Embodiment 3. In FIG. 19, the first light guide part 25 is made of, for example, quartz formed like a transparent parallel plate extending in the y-direction as having the first plane S11 and the second plane S12 parallel and opposing to each other. The first output deflection part 27 is bonded, on the first plane S11 of the first light guide part 25, to a region other than the region where the first input deflection part 26 is bonded.

The first output deflection part 27 has a beam splitting film 61 and the grating 62. The beam splitting film 61 is formed through evaporation on, for example, the first plane S11 of the first light guide part 25. The beam splitting film 61 is configured similarly to the beam splitting film 51 of Embodiment 2. The grating 62 is formed on an optical substrate 63 such as, for example, quartz, with a groove number of 2000 lines/mm. Formed on the grating 62 is a protective layer 64 made of a transparent resin such as acrylic for example. The protective layer 64 is adhered to the beam splitting film 61 via a transparent adhesive or the like, on a surface opposite to the grating 62.

The grating 62 is formed as blazed for example, so that the first-order diffracted light of obliquely-incident G light may be reflected in a substantially vertical direction to the second plane S12. The rest of the configuration is similar to that of the first propagation optical system 21 of Embodiment 2.

In the first propagation optical system 21 of FIG. 19, the light flux Lx vertically incident on the incident region of the second plane S12 is reflected by the slope S14 of the first input deflection part 26, and obliquely incident on the emitting region of the second plane S12 within the first light guide part 25. The obliquely-incident light flux Lx is incident on the second plane S12 at an angle larger than the critical angle, and totally reflected. The totally-reflected light flux Lx is obliquely incident on the beam splitting film 61, transmits therethrough in an amount at a predetermined ratio, with the rest being reflected. The light flux Lx reflected by the beam splitting film 61 is again incident on the second plane S12 at an angle larger than the critical angle and totally reflected. Thereafter, the the light flux Lx is repeatedly subjected to the partial reflection on the beam splitting film 61 and to the total reflection on the the second plane S12, so as to be propagated in the y-direction of the first light guide part 25.

Each time the light flux Lx is incident on the beam splitting film 61, the light flux Lx passes therethrough in an amount at a predetermined ratio to be incident on the grating 62. Of the light flux Lx incident on the grating 62, a first-order diffracted light is emitted in a substantially perpendicular direction onto the second plane S12. The light flux Lx of the first-order diffracted light deflected in a direction perpendicular to the second plane S12 passes through the beam splitting film 61 at the transmittance of substantially 100%, and emitted outside from the second plane S12.

The second propagation optical system 22 and the third propagation optical system 23 are configured similarly to the first propagation optical system 21 of FIG. 19.

The disclosed display device of Embodiment 4 provides the same effect as in Embodiment 1 and Embodiment 2. Further, the grating 62 is used to diffract image light to be taken out, which allows the image light to be taken out with efficiency.

Embodiment 4

Figure 20:
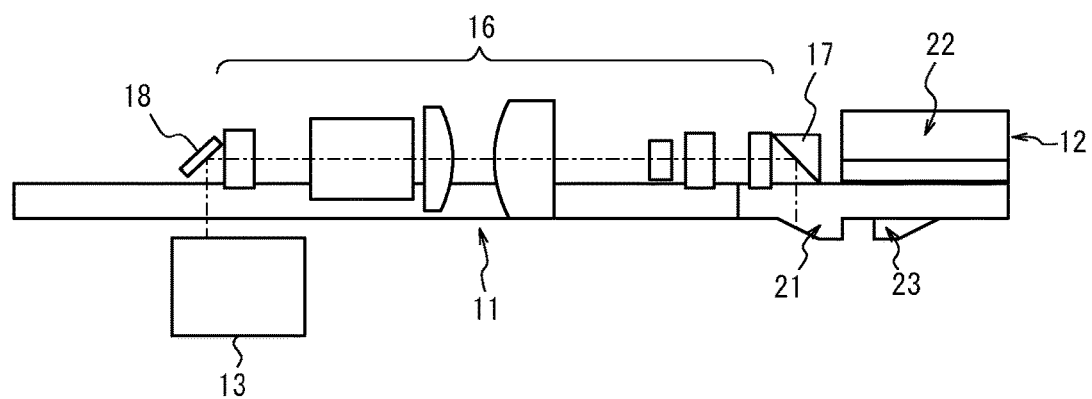
FIG. 20 illustrates a schematic configuration of the disclosed display device of Embodiment 4.

FIG. 20 illustrates a schematic configuration of the disclosed display device of Embodiment 4, which corresponds the B arrow view of FIG. 1A. The display device 10 of Embodiment 4 is different from Embodiments 1 to 3 in configuration of the projection optical system 11. The projection optical system 11 is configured by including: the light source 13, a scanning mirror 18, a projection part 16, and a folding mirror 17. That is, the projection optical system 11 of FIG. 20 includes the scanning mirror 18, in place of the light flux expanding/diffusing element 14 and the LCD panel 15 of FIGS. 1A and 2B. Further, the light source 13 is disposed so as to emit laser light in the z-direction.

The scanning mirror 18 is formed of, for example, a micro electro mechanical systems (MEMS) mirror. The scanning mirror 18 raster scans the laser light emitted from the light source 13 and causes the light to be incident on the projection part 16. The light source 13 modulates, based on the image to be projected, synchronously with the raster scan by the scanning mirror 18, and emits the laser light thus modulated. In this manner, raster-scanned image light is incident on the projection part 16. In Embodiment 4, a polarizer may be inserted in an optical path between the projection optical system 11 and the first propagation optical system 21.

The display device of Embodiment 4 generates image light through modulation of laser light from the light source 13 and raster scan by the scanning mirror 18, which allows the projection optical system 11 to be made further compact in size, as compared with the case of using the light flux expanding/diffusing element 14 and the LCD panel 15 of FIGS. 1A and 1B. Accordingly, the aforementioned configuration is advantageous in that the display device 10 may be reduced in size and thickness with more ease.

The disclosed device is not limited to those of Embodiments above, and a person skilled in the art would readily conceive of making various alterations and modifications thereto based on the disclosure. Thus, those modifications and alterations are all included in the scope of the disclosure. For example, the first propagation optical system 21, the second propagation optical system 22, and the third propagation optical system 23 with configurations explained with reference to Embodiments 1 to 3 may be combined as appropriate. However, in the case where at least one of the first propagation optical system 21, the second propagation optical system 22, and the third propagation optical system 23 is configured to include a grating explained with reference to Embodiment 3, the LCD panel 15 of FIG. 1A may employ a reflective LCOS without being limited to the transmissive one.

REFERENCE SIGNS LIST 10 display device
11 projection optical system
12 pupil enlarging optical system
13 light source
14 light flux expanding/diffusing element
15 LCD panel
16 projection part
17 folding mirror
18 scanning mirror
21 first propagation optical system
22 second propagation optical system
23 third propagation optical system
25 first light guide part
26 first input deflection part
27 first output deflection part
28, 51, 61 beam splitting film
35 second light guide part
36 second input deflection part
37 second output deflection part
45 third light guide part
46 third input deflection part
47 third output deflection part
53 triangular prism
62 grating

The invention claimed is:

1. A display device, comprising:
a projection optical system which projects image light at infinity; and
a first propagation optical system, a second propagation optical system, and a third propagation optical system, which sequentially enlarge, in one direction, the image light projected from the projection optical system,
wherein the image light emitted from the third propagation optical system allows an image to be observed.

2. The display device according to claim 1,
wherein the first propagation optical system, the second propagation optical system, and the third propagation optical system each include:
a light guide part which guides the image light incident thereon, by repeatedly reflecting the image light between two opposing faces thereof; and
an output deflection part which sequentially emits part of the image light guided through within the light guide part, from one face of the two faces to enlarge the image light, and
wherein at least the second propagation optical system has a light flux expanding direction intersecting with light flux expanding directions of the first propagation optical system and the third propagation optical system.

3. The display device according to claim 2,
wherein the output deflection part of at least one of the first propagation optical system, the second propagation optical system, and the third propagation optical system has a plurality of beam splitting films arranged along the propagation direction of the image light in the light guide part as tilted between the two faces of the light guide part, and emits the image light partially reflected by the beam splitting films, from the one face.

4. The display device according to claim 2,
wherein the output deflection part of at least one of the first propagation optical system, the second propagation optical system, and the third propagation optical system includes a beam splitting film and a prism array which are disposed on the other face of the two faces of the light guide part, so as to transmit, through the beam splitting film and the light guide part, the image light having transmitted through the beam splitting film and reflected by the prism array, and emits the image light from the other face.

5. The display device of claim 2,
wherein the output deflection part of at least one of the first propagation optical system, the second propagation optical system, and the third propagation optical system includes a beam splitting film and a grating which are disposed on the other face side of the two faces of the light guide part, so as to transmit, through the beam splitting film and the light guide part, the image light having transmitted through the beam splitting film and diffracted by the grating, and emit the image light from the other face.

6. The display device according to any one of claim 1,
wherein the projection optical system is disposed as extending substantially parallel to an emitting face of the image light in the third propagation optical system.

* * * * *